United States Patent
Saruta

(10) Patent No.: US 6,969,140 B2
(45) Date of Patent: Nov. 29, 2005

(54) PRINTER AND INK CARTRIDGE ATTACHED THERETO

(75) Inventor: Toshihisa Saruta, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/445,036

(22) Filed: May 27, 2003

(65) Prior Publication Data

US 2003/0197751 A1 Oct. 23, 2003

Related U.S. Application Data

(63) Continuation of application No. 09/449,732, filed on Nov. 26, 1999, now Pat. No. 6,631,967.

(30) Foreign Application Priority Data

| Nov. 26, 1998 | (JP) | 10-336330 |
| Nov. 26, 1998 | (JP) | 10-336331 |
| Dec. 24, 1998 | (JP) | 10-367490 |
| Jan. 11, 1999 | (JP) | 11-003993 |
| Oct. 18, 1999 | (JP) | 11-296024 |
| Nov. 25, 1999 | (JP) | 11-334001 |

(51) Int. Cl.[7] ............................................. B41J 29/393

(52) U.S. Cl. ........................................................ 347/19

(58) Field of Search .......................... 347/5, 7, 19, 23, 347/86; 711/202, 206

(56) References Cited

U.S. PATENT DOCUMENTS

| 4,626,926 A | 12/1986 | Nakamura |
| 4,695,824 A | 9/1987 | Tazaki |
| 4,961,088 A | 10/1990 | Gilliland et al. |

(Continued)

FOREIGN PATENT DOCUMENTS

EP 0443245 8/1991

(Continued)

OTHER PUBLICATIONS

Japanese Office Action mailed Sep. 16, 2003, for Application Serial No. 2002–152154.

(Continued)

*Primary Examiner*—Stephen D. Meier
*Assistant Examiner*—Julian D. Huffman
(74) *Attorney, Agent, or Firm*—Stroock & Stroock & Lavan

(57) ABSTRACT

In a printer of the present invention, an EEPROM that carries out sequential access and has a relatively small storage capacity is applied for storage elements mounted on both black and color ink cartridges, which are detachably attached to the printer. Pieces of information relating to each ink cartridge, for example, pieces of information on remaining quantities of respective inks in the ink cartridge, are stored in the storage element of the ink cartridge. A format of addressing adopted in the storage elements of the ink cartridges is different from that adopted in an EEPROM incorporated in a printer main body of the printer. A control IC provided in the printer accordingly converts the storage format of addressing, before writing the information into the storage elements of the ink cartridges. In the printer, a RAM is mounted with the control IC on a carriage, and the pieces of information to be written into the storage elements of the ink cartridges are temporarily registered in the RAM. The pieces of information are then written into the respective storage elements of the black and color ink cartridges, for example, at a timing of a power-off operation. The signal lines and the memory used in the course of writing the information into the storage elements are identical with the signal lines, through which print data are transmitted to a print head mounted on the carriage of the printer, and the memory, in which the print data are stored. The arrangement of the present invention reduces the manufacturing cost of the ink cartridge and also enables size reduction of the whole printer.

4 Claims, 18 Drawing Sheets

U.S. PATENT DOCUMENTS

| | | | |
|---|---|---|---|
| 5,049,898 A | 9/1991 | Arthur et al. | |
| 5,138,344 A | 8/1992 | Ujita | |
| 5,365,312 A | 11/1994 | Hillmann et al. | |
| 5,375,092 A | 12/1994 | Taniguchi et al. | |
| 5,410,641 A | 4/1995 | Wakabayashi et al. | |
| 5,506,611 A | 4/1996 | Ujita et al. | |
| 5,519,418 A | 5/1996 | Nishikawa et al. | |
| 5,524,230 A | 6/1996 | Sakaue et al. | |
| 5,534,899 A * | 7/1996 | Uchikata et al. | 347/49 |
| 5,610,635 A | 3/1997 | Murray et al. | |
| 5,646,660 A | 7/1997 | Murray | |
| 5,699,091 A | 12/1997 | Bullock et al. | |
| 5,786,828 A | 7/1998 | Yamamoto | |
| 5,788,388 A | 8/1998 | Cowger et al. | |
| 5,812,156 A | 9/1998 | Bullock et al. | |
| 5,835,817 A | 11/1998 | Bullock et al. | |
| 5,861,897 A | 1/1999 | Ide et al. | |
| 5,930,553 A | 7/1999 | Hirst et al. | |
| RE36,279 E | 8/1999 | Ujita | |
| 5,975,677 A | 11/1999 | Marler et al. | |
| 5,997,120 A | 12/1999 | Ohde et al. | |
| 6,019,449 A | 2/2000 | Bullock et al. | |
| 6,019,461 A | 2/2000 | Yoshimura et al. | |
| 6,048,045 A | 4/2000 | Nohata et al. | |
| 6,065,824 A | 5/2000 | Bullock et al. | |
| 6,070,958 A | 6/2000 | Kanome | |
| 6,109,723 A | 8/2000 | Castle et al. | |
| 6,126,265 A | 10/2000 | Childers et al. | |
| 6,189,989 B1 | 2/2001 | Hirabayashi et al. | |
| 6,196,670 B1 | 3/2001 | Saruta | |
| 6,312,073 B1 | 11/2001 | Inora et al. | |
| 6,371,586 B1 | 4/2002 | Saruta | |
| 6,447,090 B1 | 9/2002 | Saruta | |
| 6,494,559 B1 | 12/2002 | Tsuji | |
| 6,565,198 B2 | 5/2003 | Saruta et al. | |
| 6,631,967 B1 | 10/2003 | Saruta | |
| 2002/0085051 A1 | 7/2002 | Saruta | |
| 2002/0180851 A1 | 12/2002 | Saruta | |
| 2002/0191038 A1 | 12/2002 | Tsuji | |
| 2002/0196302 A1 | 12/2002 | Saruta | |
| 2003/0007027 A1 | 1/2003 | Saruta | |
| 2003/0058297 A1 | 3/2003 | Saruta | |

FOREIGN PATENT DOCUMENTS

| | | |
|---|---|---|
| EP | 0 854 043 | 7/1998 |
| EP | 0854044 | 7/1998 |
| EP | 0 873 873 | 10/1998 |
| EP | 0891865 | 1/1999 |
| EP | 0940259 A2 | 9/1999 |
| EP | 1004449 A2 | 5/2000 |
| EP | 1004451 A2 | 5/2000 |
| EP | 1066967 A2 | 1/2001 |
| EP | 1080911 A2 | 3/2001 |
| EP | 1080912 A2 | 3/2001 |
| EP | 1114726 A1 | 7/2001 |
| EP | 1136268 A1 | 9/2001 |
| EP | 1247651 A2 | 10/2002 |
| GB | 2350220 A | 11/2000 |
| JP | 62-184856 | 8/1987 |
| JP | 2-279344 | 11/1990 |
| JP | 4-500482 | 1/1992 |
| JP | 05027424 | 2/1993 |
| JP | 5-20275 | 3/1993 |
| JP | 5-193127 | 8/1993 |
| JP | 05-193127 | 8/1993 |
| JP | 06-126981 | 5/1994 |
| JP | 08-177608 | 7/1996 |
| JP | 8-187854 | 7/1996 |
| JP | 8-197748 | 8/1996 |
| JP | 8-224885 | 9/1996 |
| JP | 8-310007 | 11/1996 |
| JP | 08-310007 | 11/1996 |
| JP | 2594912 | 12/1996 |
| JP | 9-1823 | 1/1997 |
| JP | 09-048120 | 2/1997 |
| JP | 9-314861 | 12/1997 |
| JP | 10-217509 | 8/1998 |
| JP | 2000-301738 | 10/2000 |
| WO | WO90/00974 | 2/1990 |
| WO | WO96/05061 | 2/1996 |
| WO | WO98/52762 | 11/1998 |
| WO | WO99/65695 | 12/1999 |
| WO | WO00/26034 | 5/2000 |

OTHER PUBLICATIONS

Japanese Office Action mailed Sep. 16, 2003, for Application Serial No. 2002–179601.

Japanese Office Action mailed Oct. 28, 2003, for Application Serial No. 2002–152146.

Japanese Office Action mailed Oct. 28, 2003, for Application Serial No. 2002–171460.

Patent Abstracts of Japan, vol. 1997, No. 03, Mar. 31, 1997, JP 08 310007, Nov. 26, 1996.

Patent Abstracts of Japan, vol. 017, No. 623 (M–1511), Nov. 17, 1993, JP 08 193127, Aug. 3, 1993.

U.S. Appl. No. 09/432,272, filed Nov. 2, 1999, Saruta.

U.S. Appl. No. 10/465,650, filed Jun. 20, 2003, Saruta.

* cited by examiner

|  | Contents of Information |
|---|---|
| 700 | Frequency of attachment (initial value =0) |
| 701 | 1st Data on remaining quantity of black ink (8 bits) |
| 702 | 2nd Data on remaining quantity of black ink (8 bits) |
| 711 | Data on time (year) of unsealing ink cartridge |
| 712 | Data on time (month) of unsealing ink cartridge |
| 713 | Version data of ink cartridge |
| 714 | Data on type of ink |
| 715 | Data on year of manufacture |
| 716 | Data on month of manufacture |
| 717 | Data on date of manufacture |
| 718 | Data on production line |
| 719 | Serial number data |
| 720 | Data on recycle |

760: rows 700–702
750: rows 711–720

| | Contents of Information | |
|---|---|---|
| 600 | Frequency of attachment (initial value =0) | |
| 601 | 1st Data on remaining quantity of cyan ink (8 bits) | |
| 602 | 2nd Data on remaining quantity of cyan ink (8 bits) | |
| 603 | 1st Data on remaining quantity of magenta ink (8 bits) | |
| 604 | 2nd Data on remaining quantity of magenta ink (8 bits) | |
| 605 | 1st Data on remaining quantity of yellow ink (8 bits) | 660 |
| 606 | 2nd Data on remaining quantity of yellow ink (8 bits) | |
| 607 | 1st Data on remaining quantity of light cyan ink (8 bits) | |
| 608 | 2nd Data on remaining quantity of light cyan ink (8 bits) | |
| 609 | 1st Data on remaining quantity of light magenta ink (8 bits) | |
| 610 | 2nd Data on remaining quantity of light magenta ink (8 bits) | |
| 611 | Data on time (year) of unsealing ink cartridge | |
| 612 | Data on time (month) of unsealing ink cartridge | |
| 613 | Version data of ink cartridge | |
| 614 | Data on type of ink | |
| 615 | Data on year of manufacture | |
| 616 | Data on month of manufacture | 650 |
| 617 | Data on date of manufacture | |
| 618 | Data on production line | |
| 619 | Serial number data | |
| 620 | Data on recycle | |

Fig. 12

|   | Contents of Information |
|---|---|
| 801 | Data on remaining quantity of black ink (32 bits) |
| 802 | Data on time (year) of unsealing ink cartridge |
| 803 | Data on time (month) of unsealing ink cartridge |
| 804 | Version data of ink cartridge |
| 805 | Data on type of ink |
| 806 | Data on year of manufacture |
| 807 | Data on month of manufacture |
| 808 | Data on date of manufacture |
| 809 | Data on production line |
| 810 | Serial number data |
| 811 | Data on recycle |
| 821 | Data on remaining quantity of cyan ink (32 bits) |
| 822 | Data on remaining quantity of magenta ink (32 bits) |
| 823 | Data on remaining quantity of yellow ink (32 bits) |
| 824 | Data on remaining quantity of light cyan ink (32 bits) |
| 825 | Data on remaining quantity of light magenta ink (32 bits) |
| 826 | Data on time (year) of unsealing ink cartridge |
| 827 | Data on time (month) of unsealing ink cartridge |
| 828 | Version data of ink cartridge |
| 829 | Data on type of ink |
| 830 | Data on year of manufacture |
| 831 | Data on month of manufacture |
| 832 | Data on date of manufacture |
| 833 | Data on production line |
| 834 | Serial number data |
| 835 | Data on recycle |

PRINTER AND INK CARTRIDGE ATTACHED THERETO

BACKGROUND OF THE INVENTION

1. Field of the Invention

The present invention relates to a printer with an ink cartridge attached thereto that carries out printing by the unit of dots, as well as to an ink cartridge detachably attached to a main body of the printer. More specifically the invention pertains to a technique of storing information into the ink cartridge.

2. Description of the Related Art

The printing apparatus like the ink jet printer and the ink jet plotter mainly includes an ink cartridge, in which one or plural inks are kept, and a printer main body with a print head to carry out actual printing operations on a printing medium. The print head transfers ink fed from the ink cartridge onto the printing medium, such as printing paper, so as to implement printing on the printing medium. The ink cartridge is designed to be detachably attached to the printer main body. A new ink cartridge has a predetermined quantity of ink kept therein. When the ink kept in an ink cartridge runs out, the ink cartridge is replaced with a new one. Such a printing apparatus is arranged to cause the printer main body to calculate the remaining quantity of ink in the ink cartridge based on the amount of ink transferred from the print head and to inform the user of a state of running out of the ink, in order to prevent the printing procedure from being interrupted by the out-of-ink.

The data on the remaining quantities of inks are generally stored only in the printer main body or in a printer driver that controls the printer. In the event that a first ink cartridge is replaced with a second ink cartridge in the course of the printing operation, the information relating to the first ink cartridge, such as the data on the remaining quantities of inks, are thus lost or made wrong.

One proposed technique to solve this problem utilizes a non-volatile memory provided in the ink cartridge and causes the required data, for example, the data on the remaining quantities of inks, to be written from the printer main body into the non-volatile memory (for example, JAPANESE PATENT LAID-OPEN GAZETTE No. 62-184856). In the case of replacement of the ink cartridge during the printing operation, this technique ensures the storage of the data on the remaining quantities of inks.

The ink cartridge attached to the printer is expendable. A non-volatile memory generally used in the printer, for example, a large-sized, expensive non-volatile memory having a relatively large storage capacity of several kilobytes and more than ten terminals, is not applicable for the ink cartridge. Using such a non-volatile memory makes the ink cartridge undesirably bulky and increases the manufacturing cost of the expendable ink cartridge, which is abandoned after the ink kept in the ink cartridge runs out.

One proposed technique accordingly applies a small-sized special non-volatile memory having a relatively small storage capacity for the ink cartridge. The non-volatile memory with only several terminals adopts a specific format of addressing, which is different from the format of addressing adopted in the general non-volatile memories. This accordingly arises another problem of difficulty in handling.

In the case where the different addressing format is adopted, the computer that controls the writing operation of data may carry out conversion of the addressing format. In the case of an ink cartridge having an ink reservoir, in which a plurality of different inks are kept, and information is require to be held, such as pieces of information on the amounts of ink consumption, independently with regard to each of the respective inks, however, relatively long data lengths need to be written and the address conversion may take an undesirably long time. Such a disadvantage is not negligible since it may cause all the data to be not rewritten when an insufficient time period is provided for the address conversion, for example, at the time of a forcible cut-off of a power supply.

The problems discussed above arise in any printing apparatus that does not directly measure the remaining quantity of ink or the amount of ink consumption in an ink cartridge but causes the printer to compute such data, and in an ink cartridge attached thereto. Such printing apparatus includes an ink jet-type printing apparatus that uses ink obtained by mixing or dissolving a pigment or a dye with or in a solvent and transfers ink droplets in the liquid state to implement printing, a printing apparatus that uses an ink cartridge with an ink toner accommodated therein, and a thermal transfer-type printing apparatus.

SUMMARY OF THE INVENTION

The object of the present invention is thus to provide a technique that is applicable to a printer and an ink cartridge attached thereto and enables information relating to the ink cartridge, such as pieces of information on remaining quantities of inks, to be adequately processed, while not increasing the manufacturing cost of the ink cartridge.

At least part of the above and the other related objects is actualized by a first printer, to which an ink cartridge is detachably attached, wherein the ink cartridge keeps ink therein and has a rewritable non-volatile memory. The first printer causes the ink kept in the ink cartridge to be transferred from a print head mounted on the printer to a printing medium, thereby implementing a printing operation. The first printer includes: a printer memory that stores information relating to the ink kept in the ink cartridge into a predetermined area thereof in a predetermined format of addressing, which is different from a specific format of addressing adopted in the non-volatile memory; a memory writing unit that reads the information relating to the ink kept in the ink cartridge from the predetermined area and writes the read-out information into a specific area of the non-volatile memory, which corresponds to the predetermined area of the printer memory; and an address decoder that converts a storage format of addressing of the information relating to the ink from the predetermined format of addressing into the specific format of addressing when the memory writing unit writes the information.

The present invention is also directed to a first method that corresponds to the first printer discussed above. The present invention thus provides a first method of writing information relating to ink kept in an ink cartridge into a rewritable non-volatile memory incorporated in the ink cartridge, which is detachably attached to a printer, wherein the printer causes the ink kept in the ink cartridge to be transferred from a print head mounted on the printer to a printing medium, thereby implementing a printing operation. The first method includes the steps of: storing the information relating to the ink kept in the ink cartridge into a predetermined area of a printer memory incorporated in the printer in a predetermined format of addressing, which is different from a specific format of addressing adopted in the non-volatile memory; reading the information relating to the ink kept in the ink cartridge from the predetermined area; converting a storage format of addressing of the information relating to the ink from the predetermined format of addressing into the specific format of addressing; and writing the information in the converted specific format of addressing into a specific area of the non-volatile memory, which corresponds to the predetermined area of the printer memory.

In the first printer and the corresponding first method of the present invention, the information relating to the ink kept in the ink cartridge is stored in different formats of addressing in the printer memory incorporated in the printer and in the non-volatile memory incorporated in the ink cartridge. The address decoder converts the storage format of addressing when the information is written into the non-volatile memory of the ink cartridge. This arrangement enables the information relating to the ink to be readily written into the non-volatile memory of the ink cartridge, even when the format of addressing adopted in the non-volatile memory is different from that adopted in the printer memory.

In the first printer of the present invention, in the case where the ink cartridge is detachably attached to a carriage that has the print head mounted thereon and moves forward and backward relative to the printing medium, the address decoder may also be disposed on the carriage. This arrangement shortens the distance between the address decoder and the ink cartridge. This is especially advantageous when there is a difficulty in extending the signal lines because of the specific format of addressing adopted in the non-volatile memory of the ink cartridge.

The present invention is further directed to a first ink cartridge that corresponds to the first printer discussed above. The present invention accordingly provides a first ink cartridge that keeps ink therein and is detachably attached to a printer with a print head, wherein the printer causes the ink kept in the ink cartridge to be transferred from the print head to a printing medium by a unit of dot, thereby implementing a printing operation. The first ink cartridge includes: a rewritable non-volatile memory; an input unit that receives information relating to ink kept in the ink cartridge, which has been stored in a predetermined format of addressing in a predetermined area of a printer memory incorporated in the printer, in a specific format of addressing that is different from the predetermined format of addressing; and a writing controller that writes the information into the non-volatile memory in the specific format of addressing received by the input unit.

In the first ink cartridge of the present invention, the information, which has been stored in a predetermined format of addressing in a predetermined area of the printer memory incorporated in the printer, is received in a specific format of addressing that is different from the predetermined format of addressing and written into the non-volatile memory. This means that the data are written into the non-volatile memory of the ink cartridge, irrespective of the format of addressing adopted in the printer memory. In a similar manner, the reading operation of data may be carried out in the specific format of addressing that is different from the format of addressing adopted in the printer memory.

In accordance with one preferable application of the present invention, the non-volatile memory of the ink cartridge carries out transmission of data by serial access, and the information is written into the non-volatile memory synchronously with a clock for addressing. The non-volatile memory of the serial access type generally has a reduced number of terminals and is small in size, thereby contributing to the size reduction of the whole ink cartridge.

The information written into the non-volatile memory is, for example, a piece of information relating to the quantity of ink in the ink cartridge. The piece of information relating to the quantity of ink may regard a remaining quantity of ink or an amount of ink consumption with respect to the ink cartridge.

In accordance with another preferable application of the present invention, a plurality of different inks are kept in the ink cartridge, and the address decoder carries out the conversion of the storage format of addressing corresponding to a plurality of areas provided for the respective inks in the non-volatile memory. In a color ink cartridge with three different colors, for example, cyan, magenta, and yellow, kept therein, this arrangement facilitates the storage of information with regard to the respective color inks. The same principle is applicable to another ink cartridge, in which at least five different inks are kept. In these cases, the storage capacity of not greater than 2 bytes is allocated to store apiece of information relating to the quantity of each ink. The allocation of the storage capacity of approximately 2 bytes to each ink enables the data to be written into the non-volatile memory of the ink cartridge within a short time period.

In accordance with still another preferable application of the present invention, the non-volatile memory of the ink cartridge has two information storage areas, in order to enhance the reliability of the stored information. In this structure, the address decoder alternately specifies one of two different addresses every time a requirement of writing information, which has been stored in one area of the printer memory, into the non-volatile memory is output. This arrangement causes the address decoder to specify the addresses and thereby reduces the loading to the printer main body.

The information may be written into the non-volatile memory of the ink cartridge after at least one of a timing when a power-off instruction is given to turn off a power source of the printer, a timing when power supply to the printer is cut off, and a timing when a replacement instruction is given to replace the ink cartridge. In this arrangement, the address decoder carries out the conversion of the storage format of addressing and writes the information having the converted format into the non-volatile memory after at least one of the above timings. Writing the information into the non-volatile memory of the ink cartridge at the above timings enables the reliability of information to be kept at a sufficient level. In the case where the ink cartridge is detached from the printer, this arrangement enables the latest data to be stored in the non-volatile memory of the ink cartridge. A cleaning operation is generally carried out in an ink jet printer, in order to prevent nozzles on the print head from being clogged. The cleaning operation consumes a preset amount of ink. It is accordingly desirable to update the information relating to the quantity of ink after each cleaning operation.

A programmable ROM that is erasable electrically, a flash ROM, or a ferroelectric memory may be applied for the non-volatile memory of the ink cartridge.

The present invention is also directed to a second printer, to which an ink cartridge is detachably attached, wherein the ink cartridge keeps ink therein and has a rewritable non-volatile memory. The second printer causes the ink kept in the ink cartridge to be transferred from a plurality of dot-forming elements, which are formed on a print head mounted on the printer, to a printing medium by a unit of dot, thereby implementing a printing operation. The second printer includes: a printer memory that stores information relating to the ink kept in the ink cartridge into a predetermined area thereof; a data registration unit that is disposed on a carriage, which has the print head mounted thereon and moves forward and backward relative to the printing medium, and temporarily registers therein the information relating to the ink, which is read from the predetermined area of the printer memory; and a memory writing unit that writes the information temporarily registered in the data registration unit into a specific area of the non-volatile memory, which corresponds to the predetermined area of the printer memory.

The present invention is also directed to a second method that corresponds to the second printer discussed above. The present invention thus provides a second method of writing information relating to ink kept in an ink cartridge into a rewritable non-volatile memory incorporated in the ink cartridge, which is detachably attached to a printer, wherein the printer causes the ink kept in the ink cartridge to be transferred from a plurality of dot-forming elements, which are formed on a print head mounted on the printer, to a printing medium by a unit of dot, thereby implementing a printing operation. The second method includes the steps of: storing the information relating to the ink kept in the ink cartridge into a predetermined area of a printer memory incorporated in the printer; temporarily storing the information relating to the ink, which is read from the predetermined area of the printer memory, into a temporary memory that is disposed on a carriage, which has the print head mounted thereon and moves forward and backward relative to the printing medium; and writing the information temporarily stored in the temporary memory into a specific area of the non-volatile memory, which corresponds to the predetermined area of the printer memory.

The present invention is further directed to a second ink cartridge that corresponds to the second printer discussed above. The present invention accordingly provides a second ink cartridge that keeps ink therein and is detachably attached to a carriage set on a printer, wherein the printer has a plurality of dot-forming elements formed on a print head mounted on the carriage that moves forward and backward relative to a printing medium. The printer causes the ink kept in the ink cartridge to be transferred from the plurality of dot-forming elements on the print head to the printing medium by a unit of dot, thereby implementing a printing operation. The second ink cartridge includes: a rewritable non-volatile memory; an input unit that receives information relating to ink kept in the ink cartridge, which has been stored in a predetermined format of addressing in a temporary memory mounted on the carriage for temporarily storing information, in a specific format of addressing that is different from the predetermined format of addressing; and a writing controller that writes the information into the nonvolatile memory in the specific format of addressing received by the input unit.

In the second printer as well as the corresponding second method and the second ink cartridge of the present invention, the information relating to the ink kept in the ink cartridge is stored in a predetermined area of the printer memory. The information read from the predetermined area of the printer memory is temporarily registered in the temporary memory on the carriage and eventually written into the non-volatile memory of the ink cartridge. This arrangement does not require the time-consuming process of reading the respective pieces of information from the printer memory in response to each demand, but facilitates the writing operation of data into the nonvolatile memory of the ink cartridge.

At least a partial area of a specific memory, in which data corresponding to a driving signal to the dot-forming elements formed on the print head are temporarily stored, may be utilized as the temporary memory. The print head mounted on the carriage may have such a memory, in which data corresponding to a driving signal to the dot-forming elements are temporarily stored. This simplifies the configuration of the storage process.

The information read from the printer memory may be registered into the temporary memory by utilizing the signal line, through which data corresponding to a driving signal to the dot-forming elements are output to the dot-forming elements. This simplifies the configuration of the storage process.

A common hardware configuration may be applicable for output of data to the dot-forming elements and for output of information to the non-volatile memory. In this case, one desirable structure has a mechanism of selecting either one of the output of data to the dot-forming elements and the output of information to the non-volatile memory. One concrete example of such structure cuts off the power supply to the non-volatile memory in the case of the output of data corresponding to a driving signal to the dot-forming elements.

In any one of the above applications, the information relating to the quantity of ink may regard a remaining quantity of ink or an amount of ink consumption with respect to the ink cartridge. The non-volatile memory may be a memory that carries out transmission of data by serial access, for example, a programmable ROM that is erasable electrically, a flash ROM, or a ferroelectric memory.

The structure of incorporating the non-volatile memory in the ink cartridge is applicable to any type of the ink cartridge. For example, in the case where both a black ink cartridge, in which black ink is kept, and a color ink cartridge, in which a plurality of different color inks are kept, are detachably attached to the printer, the non-volatile memory is provided in both the black ink cartridge and the color ink cartridge, and required pieces of information are written into the respective non-volatile memories. The configuration that provides a non-volatile memory for each ink cartridge enables the data on the quantity of ink with regard to each ink cartridge to be processed independently. The principle of the present invention is also applicable to a printer, to which only a black ink cartridge or a color ink cartridge is detachably attached.

These and other objects, features, aspects, and advantages of the present invention will become more apparent from the following detailed description of the preferred embodiment with the accompanying drawings.

BRIEF DESCRIPTION OF THE DRAWINGS

FIG. 10 shows a data array in the storage element 80 incorporated in the black ink cartridge 107K attached to the printer 1 in the embodiment;

FIG. 11 shows a data array in the storage element 80 incorporated in the color ink cartridge 107F attached to the printer 1 in the embodiment;

FIG. 12 shows a data array in an EEPROM 90 incorporated in the print controller 40 of the printer 1 in the embodiment;

DESCRIPTION OF THE PREFERRED EMBODIMENT (Mechanical Structure of Printer 1)

Figure 1:
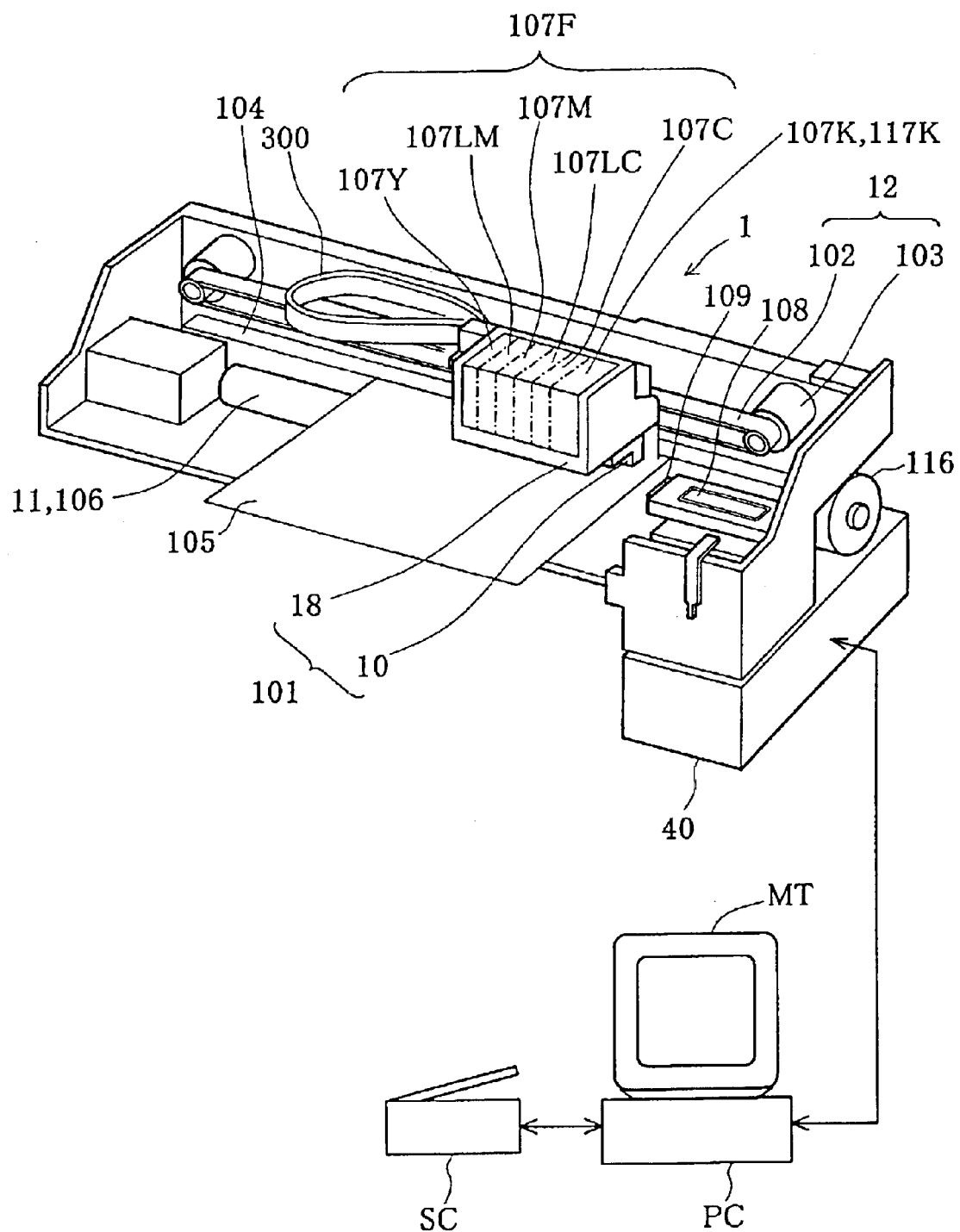
FIG. 1 is a perspective view illustrating the structure of a main part of a printer 1 in one embodiment according to the present invention.

FIG. 1 is a perspective view illustrating the structure of a main part of an ink jet printer 1 in one embodiment according to the present invention. The printer 1 of the embodiment is used in connection with a computer PC, to which a scanner SC is also connected. The computer PC reads and executes an operating system and predetermined programs to function, in combination with the printer 1, as a printing apparatus. The computer PC executes an application program on a specific operating system, carries out processing of an input image, for example, read from the scanner SC, and displays a processed image on a CRT display MT. When the user gives a printing instruction after the required image processing, for example, retouching the image on the CRT display MT, is concluded, a printer driver incorporated in the operating system is activated to transfer processed image data to the printer 1. A CD drive (not shown) that reads a recording medium, such as a CD-ROM, and other non-illustrated drives are mounted on the computer PC.

The printer driver converts original color image data, which are input from the scanner SC and subjected to the required image processing, to color image data printable by the printer 1 in response to the printing instruction, and outputs the converted color image data to the printer 1. The original color image data consists of three color components, that is, red (R), green (G), and blue (B). The converted color image data printable by and output to the printer 1 consists of six color components, that is, black (K), cyan (C), light cyan (LC), magenta (M), light magenta (LM), and yellow (Y). The printable color image data are further subjected to binary processing, which specifies the on-off state of ink dots. These image processing and data conversion processes are known in the art and are thus not specifically described here. These processes may be carried out in the printer 1, in place of the printer driver included in the computer PC, as discussed later.

The following describes the basic structure of the printer 1. Referring to FIG. 1, the printer 1 has a print controller 40 that is in charge of control procedures and a print engine 5 that actually performs ejection of ink. The print controller 40 and the print engine 5 are incorporated in a printer main body 100. The print engine 5 included in the printer main body 100 has a print head 10, a sheet feed mechanism 11, and a carriage mechanism 12. The print head 10 is integrally formed with a cartridge attachment unit 18 to construct a carriage 101. The print head 10, which is an ink jet type, is mounted on a specific face of the carriage 101 that faces a sheet of printing paper 105, that is, a lower face of the carriage 101 in this embodiment. Transfer of print data to the print head 10 is carried out via a flexible flat cable (FFC) 300. The carriage mechanism 12 includes a carriage motor 103 and a timing belt 102. The carriage motor 103 drives the carriage 101 via the timing belt 102. The carriage 101 is guided by a guide member 104 and moves forward and backward along a width of the printing paper 105 by means of normal and reverse rotations of the carriage motor 103. The sheet feed mechanism 11 that feeds the printing paper 105 includes a sheet feed roller 106 and a sheet feed motor 116.

A black ink cartridge 107K and a color ink cartridge 107F, which will be described later, are detachably attached to the cartridge attachment unit 18 of the carriage 101. The print head 10 receives supplies of inks fed from these ink cartridges 107K and 107F and ejects ink droplets against the printing paper 105 with a movement of the carriage 101, so as to create dots and print a picture image or letters on the printing paper 105.

Each of the ink cartridges 107K and 107F has a cavity therein for keeping ink, which is prepared by dissolving or dispersing a dye or a pigment in a solvent. The cavity for keeping ink therein is generally referred to as an ink chamber. The black ink cartridge 107K has an ink chamber 117K, in which black ink (K) is kept. The color ink cartridge 107F has a plurality of ink chambers 107C, 107LC, 107M, 107LM, and 107Y, which are formed separately. Cyan ink (C), light cyan ink (LC), magenta ink (M), light magenta ink (LM), and yellow ink (Y) are kept respectively in these ink chambers 107C, 107LC, 107M, 107LM, and 107Y. The print head 10 receives supplies of various color inks fed from the respective ink chambers 107C, 107LC, 107M, 107LM, and 107Y, and ejects ink droplets of various colors to implement color printing.

A capping unit 108 and a wiping unit 109 are disposed on one end of the printer 1, which is included in a non-printable area. The capping unit 108 closes nozzle opening formed on the print head 10 during the stoppage of printing operation. The capping unit 108 effectively prevents the solvent component in the ink from being vaporized during the stoppage of printing operation. Preventing the vaporization of the solvent component in the ink favorably depresses an increase in viscosity of ink and formation of an ink film. Capping the nozzle openings during the stoppage of printing operation effectively prevents the nozzles from being clogged. The capping unit 108 also has a function of collecting ink droplets ejected from the print head 10 by a flushing operation. The flushing process is carried out to eject ink when the carriage 101 reaches the end of the printer 1 during the execution of the printing operation. The flushing process is one of the actions for preventing the nozzles from being clogged. The wiping unit 109 is located in the vicinity of the capping unit 108 to wipe the surface of the print head 10, for example, with a blade, so as to wipe out the ink residue or paper dust adhering to the surface of the print head 10. In addition to these actions, the printer 1 of the embodiment carries out a sucking operation with regard to the nozzles, for example, in the case of abnormality occurring due to invasion of bubbles into the nozzles. The sucking process presses the capping unit 108 against the print head 10 to seal the nozzle openings, activates a suction pump (not shown), and makes a passage connecting with the capping unit 108 in a negative pressure, so as to cause ink to be sucked out of the nozzles on the print head 10. The flushing operation, the wiping operation, and the sucking operation are included in a head cleaning procedure. The wiping operation may be carried out by an automatic mechanism that uses a preset blade and automatically wipes the surface of the print head 10 with forward and backward movements of the carriage 101. In this case, only the flushing operation and the sucking operation are included in the active head cleaning procedure.

(Structure of Ink Cartridges 107K, 107F and Cartridge Attachment Unit 18)

The following describes the attachment of the ink cartridges 107K and 107F to the ink jet printer 1. The black ink cartridge 107K and the color ink cartridge 107F have a common basic structure. The following description accordingly regards the structure of the ink cartridge, the black ink cartridge 107K as an example, and the structure of the cartridge attachment unit 18 of the printer main body 100, which receives and holds the ink cartridge 107K attached thereto, with reference to FIGS. 2A, 2B, and 3.

Figure 2A:
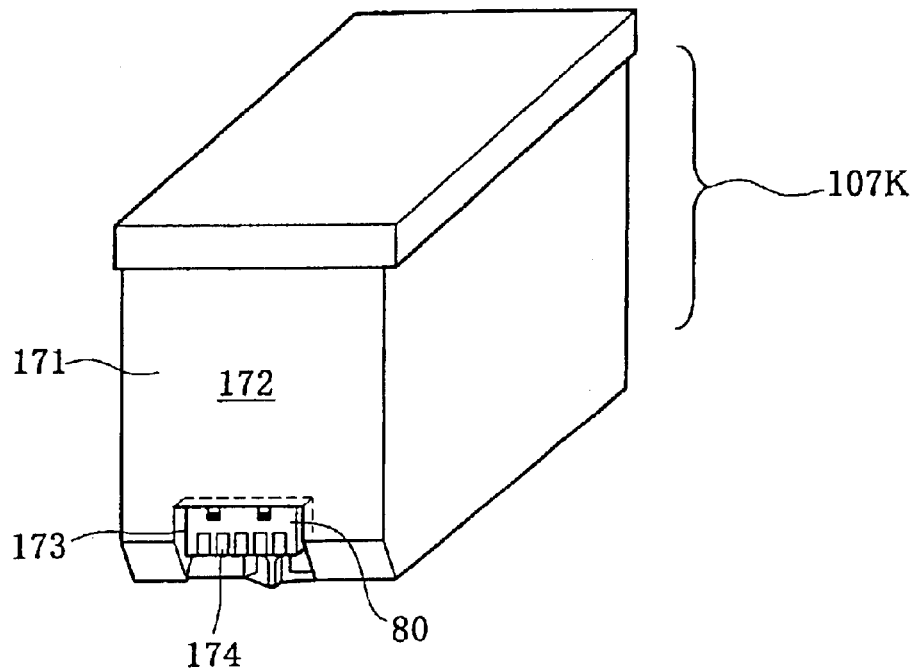
FIGS. 2A and 2B are perspective views respectively illustrating the structures of an ink cartridge 107K and a cartridge attachment unit 18 in the embodiment.
Figure 2B:
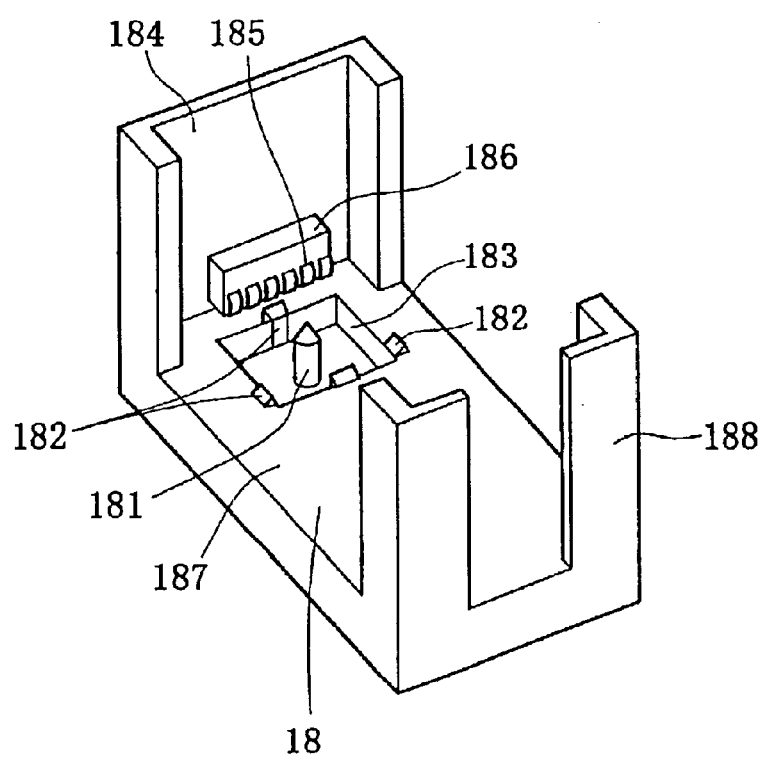
Figure 3:
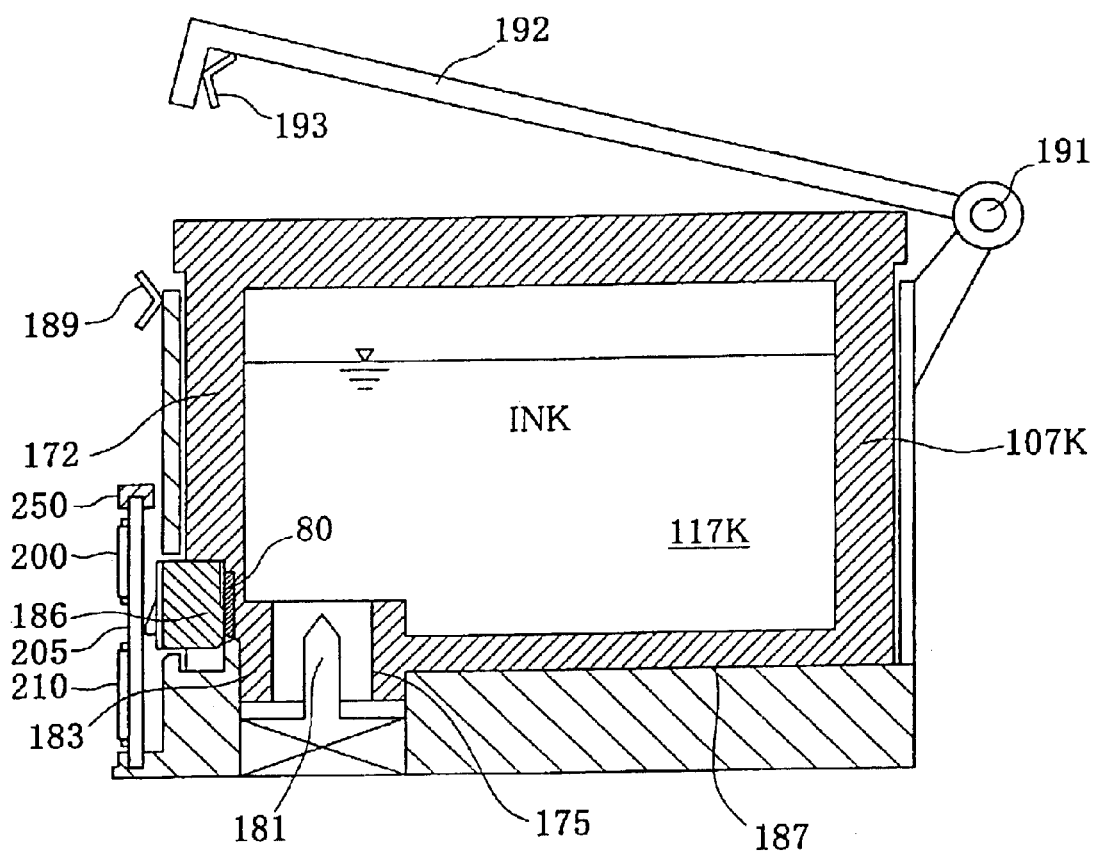
FIG. 3 is a sectional view illustrating an attachment state in which the ink cartridge 107K shown in FIG. 2A is attached to the cartridge attachment unit 18 shown in FIG. 2B.

FIGS. 2A and 2B are perspective views schematically illustrating the structures of the ink cartridge 107K and the cartridge attachment unit 18 of the printer main body 100. FIG. 3 is a sectional view illustrating an attachment state in which the ink cartridge 107K is attached to the cartridge attachment unit 18.

Referring to FIG. 2A, the ink cartridge 107K has a cartridge main body 171 that is composed of a synthetic resin and defines the ink chamber 117K in which black ink is kept, and a storage element (non-volatile memory) 80 incorporated in a side frame 172 of the cartridge main body 171. An EEPROM is generally applied for the storage element 80 that is rewritable by electrically erasing the non-required contents of storage and maintains the contents of storage even after the power supply is cut off. The allowable frequency of rewriting data in the storage element 80 is about ten thousand times, which is significantly lower than the allowable frequency of rewriting in an EEPROM 90 (described later) incorporated in the print controller 40. This makes the cost of the storage element 80 extremely low. The storage element 80 enables transmission of various data to and from the print controller 40 of the printer 1, while the ink cartridge 107K is attached to the cartridge attachment unit 18 of the printer main body 100 shown in FIG. 2B. The storage element 80 is received in a bottom-opened recess 173 formed in the side frame 172 of the ink cartridge 107K. The storage element 80 has a plurality of connection terminals 174 exposed to the outside in this embodiment. The whole storage element 80 may, however, be exposed to the outside. Alternatively the whole storage element 80 is embedded, and separate connection terminals may be provided independently.

Referring to FIG. 2B, the cartridge attachment unit 18 has an ink supply needle 181, which is disposed upward on a bottom 187 of a cavity, in which the ink cartridge 107K is accommodated. A recess 183 is formed about the needle 181. When the ink cartridge 107K is attached to the cartridge attachment unit 18, an ink supply unit 175 (see FIG. 3), which is projected from the bottom of the ink cartridge 107K, is fitted in the recess 183. Three cartridge guides 182 are set on the inner wall of the recess 183. A connector 186 is placed on an inner wall 184 of the cartridge attachment unit 18. The connector 186 has a plurality of electrodes 185, which are in contact with and thereby electrically connect with the plurality of connection terminals 174 of the storage element 80 included in the ink cartridge 107K that is set in the cartridge attachment unit 18.

The connector 186 is arranged to pass through the inner wall 184 and has a contact pin that is disposed on the opposite side of the electrodes 185 and is in contact with a control board 205 mounted on the carriage 101 as shown in the sectional view of FIG. 3. When the control board 205 is attached to an outer fixation element 250 of the cartridge attachment unit 18, the control board 205 electrically connects with the storage element 80 via the connector 186. The connector 186 functions as a signal path, through which signals are transmitted between the storage element 80 and the control board 205. The control board 205 is connected to a parallel input-output interface 49 of the print controller 40 (described later) via the FFC 300.

Figure 4:
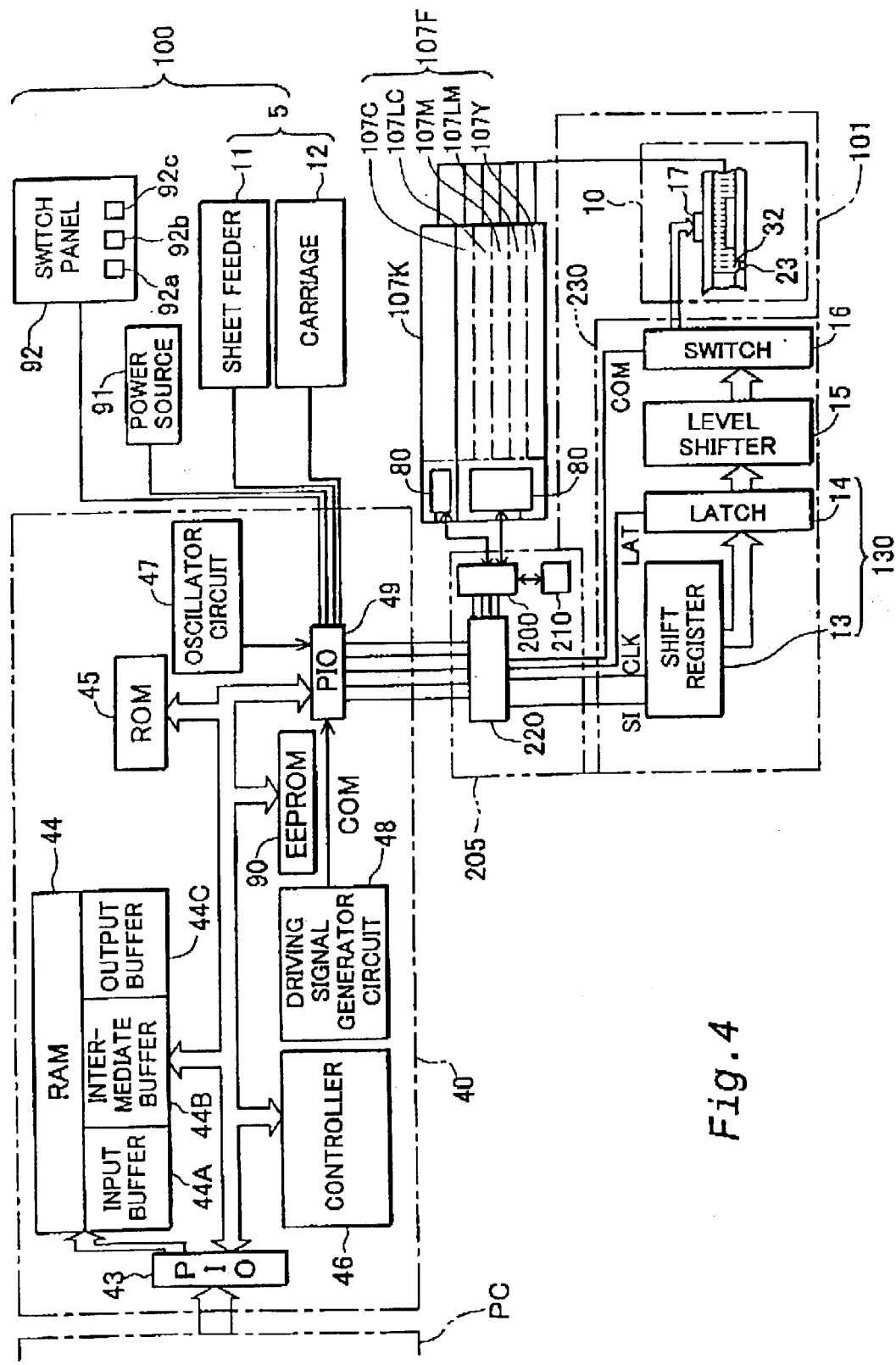
FIG. 4 is a block diagram illustrating the internal structure of the printer 1 of the embodiment including a print controller 40.

The following describes the detailed structure of the print controller 40 included in the printer 1, as well as data transmission between the print controller 40 and the print head 10 mounted on the carriage 101 and between the print controller 40 and the storage elements 80 incorporated in the black and color ink cartridges 107K and 107F. FIG. 4 is a functional block diagram illustrating the ink jet printer 1 of this embodiment. The print controller 40 has an interface 43 that receives various data, such as print data, transmitted from the computer PC, a RAM 44 in which the various data including print data are stored, and a ROM 45 in which programs for various data processing are stored. The print controller 40 further has a controller 46 including a CPU, an oscillator circuit 47, a driving signal generator circuit 48 that generates a driving signal COM given to the print head 10, and the parallel input-output interface 49 that transmits the print data developed to dot pattern data and the driving signal COM to the print engine 5.

Control lines of a switch panel 92 and a power source 91 are also connected to the print controller 40 via the parallel input-output interface 49. The switch panel 92 has a power switch 92a for turning the power source 91 on and off, a cartridge switch 92b for giving an instruction to replace the ink cartridge currently attached to the printer 1 with another ink cartridge, and a cleaning switch 92c for giving an instruction to perform the forcible cleaning of the print head 10. When the power switch 92a on the switch panel 92 is operated to input an instruction of a power-off operation, a requirement of non-maskable interruption NMI is generated. The print controller 40 immediately shifts to a predetermined interruption process and outputs a power down instruction to the peripheral circuit including the power source 91, in response to the requirement of non-maskable interruption NMI. The power source 91 receives the power down instruction and falls into a stand-by state. In the stand-by state, the power source 91 supplies a stand-by electric power to the print controller 40 via a power supply line (not shown), while stopping the main power supply. The standard power-off operation carried out via the switch panel 92 thus does not completely cut off the power supply to the print controller 40.

The requirement of non-maskable interruption NMI is also output when the cartridge switch 92*b* on the switch panel 92 is operated to give an instruction of replacing the ink cartridge, and when the power plug is pulled out of the socket. In response to the output of the requirement of non-maskable interruption NMI, the print controller 40 executes an interruptive processing routine discussed later. In the interruptive processing routine, the case of an output of the requirement of interruption NMI due to an operation of a switch on the switch panel 92 is distinguishable from the case of an output of the requirement of interruption NMI due to the forcible cut-off of the power supply. Different processes may thus be carried out according to the cause of the output of the requirement of interruption NMI, as discussed later. The power source 91 has an auxiliary power unit, for example, a capacitor, to ensure a power supply for a predetermined time period, for example, 0.3 seconds, after the power plug is pulled out of the socket.

The print controller 40 has the EEPROM 90 mounted thereon as a memory of the printer main body 100, which stores information relating to the black ink cartridge 107K and the color ink cartridge 107F mounted on the carriage 101 as shown in FIG. 1. The EEPROM 90 stores plural pieces of specific information including information relating to quantities of inks in the black ink cartridge 107K and the color ink cartridge 107F, as discussed later in detail. The ink quantity-relating information may regard the remaining quantities of the respective inks in the ink cartridges 107K and 107F or the amounts of consumption of the respective inks with regard to the ink cartridges 107K and 107F.

(Connection Between Print Controller 40 and Carriage 101)

The FFC 300 that connects the parallel input-output interface 49 of the print controller 40 with the carriage 101 has five signal lines. Namely data are transferred through only these five signal lines from the print controller 40 to the print head 10 mounted on the carriage 101 and to the storage elements 80 incorporated in the ink cartridges 107K and 107F set on the carriage 101.

Figure 5:
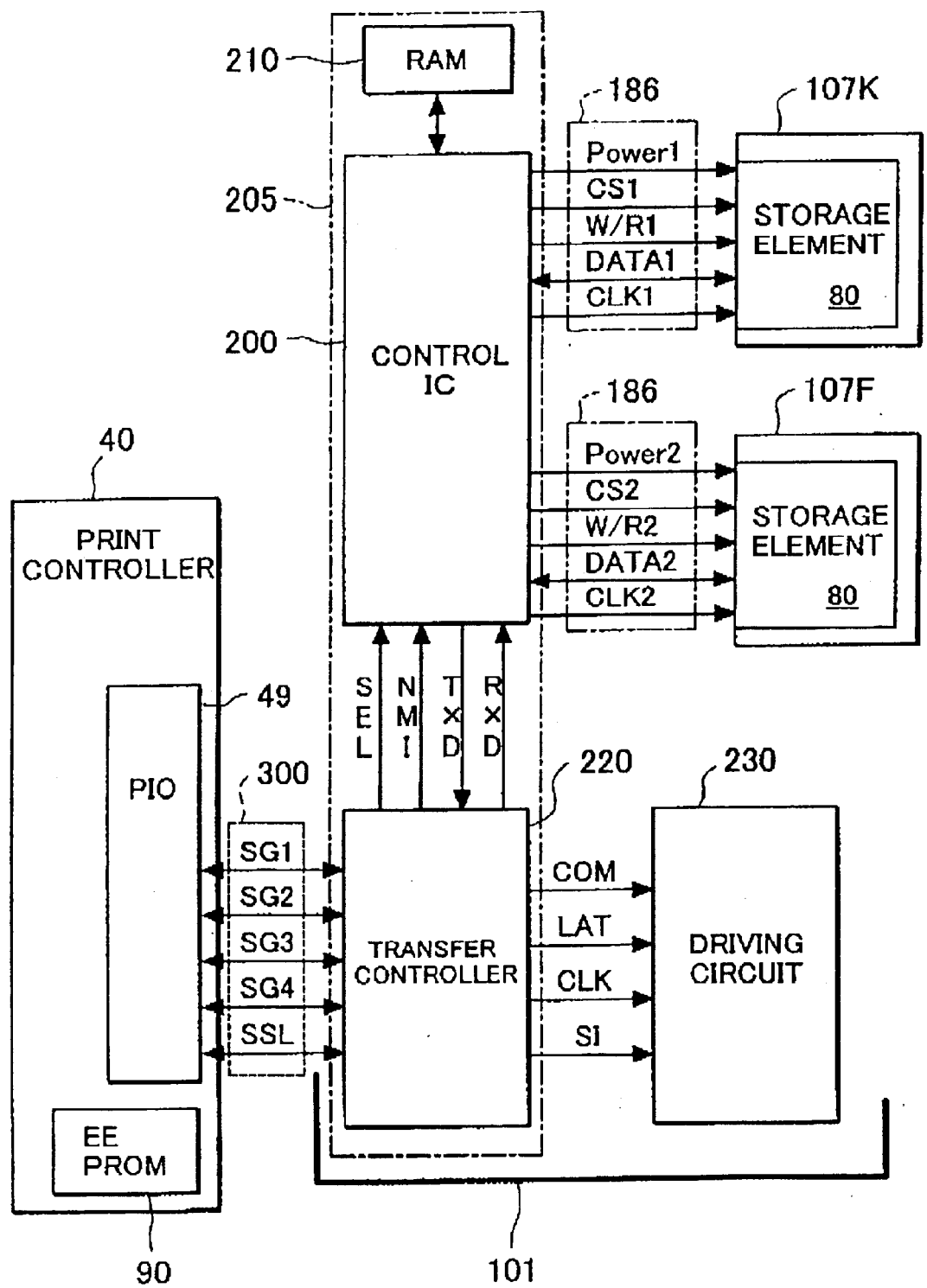
FIG. 5 is a block diagram showing connections of a control IC 200 in the embodiment.

The control board 205 is connected with the print controller 40 via the FFC 300. A transfer controller 220, a control IC 200, and a RAM 210 are mounted on the control board 205. FIG. 5 shows the detailed structure of the control board 205 on the carriage 101 and the peripheral elements. As shown in FIG. 5, the transfer controller 220 on the control board 205 controls data transmission between the control IC 200 and the print controller 40 and output of data from the print controller 40 to a driving circuit 230, using four signals SG1 through SG4 and a selection control signal SSL received via the FFC 300.

Namely the transfer controller 220 selects either the control IC 200 or the driving circuit 230 as the destination of data transmission from and to the parallel input-output interface 49 of the print controller 40 via the FFC 300. The four signals SG1 through SG4 connecting with the parallel input-output interface 49 are output to the driving circuit 230 as the driving signal COM, a latch signal LAT, a clock signal CLK, and recording data S1, in the case where the selection control signal SSL is at the high level. In the case where the selection control signal SSL is at the low level, on the other hand, the four signals SG1 through SG4 are connected with the control IC 200 as a receiving signal RxD, a transmitting signal TxD, a power down signal NMI, and a selection signal SEL.

When the selection control signal SSL is at the high level, the print controller 40 enables signals for generating an image to be output from the parallel input-output interface 49 to the driving circuit 230 via the transfer controller 220. The print controller 40 causes ink droplets to be ejected from the respective nozzles on the print head 10, so as to implement printing, while driving the sheet feed mechanism 11 and the carriage mechanism 12 of the print engine 5. This process is described more in detail.

Figure 6:
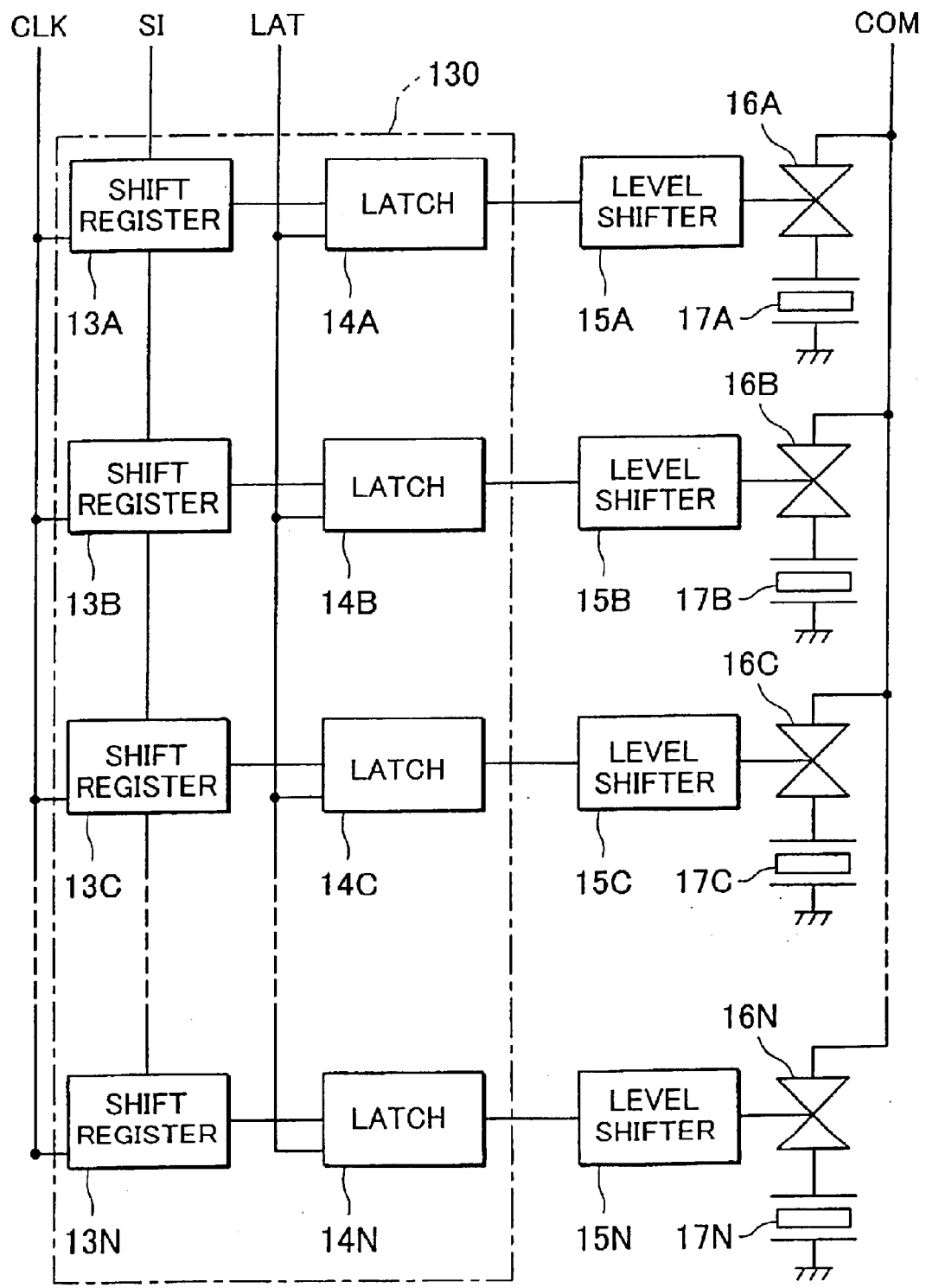
FIG. 6 is a block diagram showing an internal structure of a driving circuit 230 of a print head 10 in the embodiment.
Figure 7:
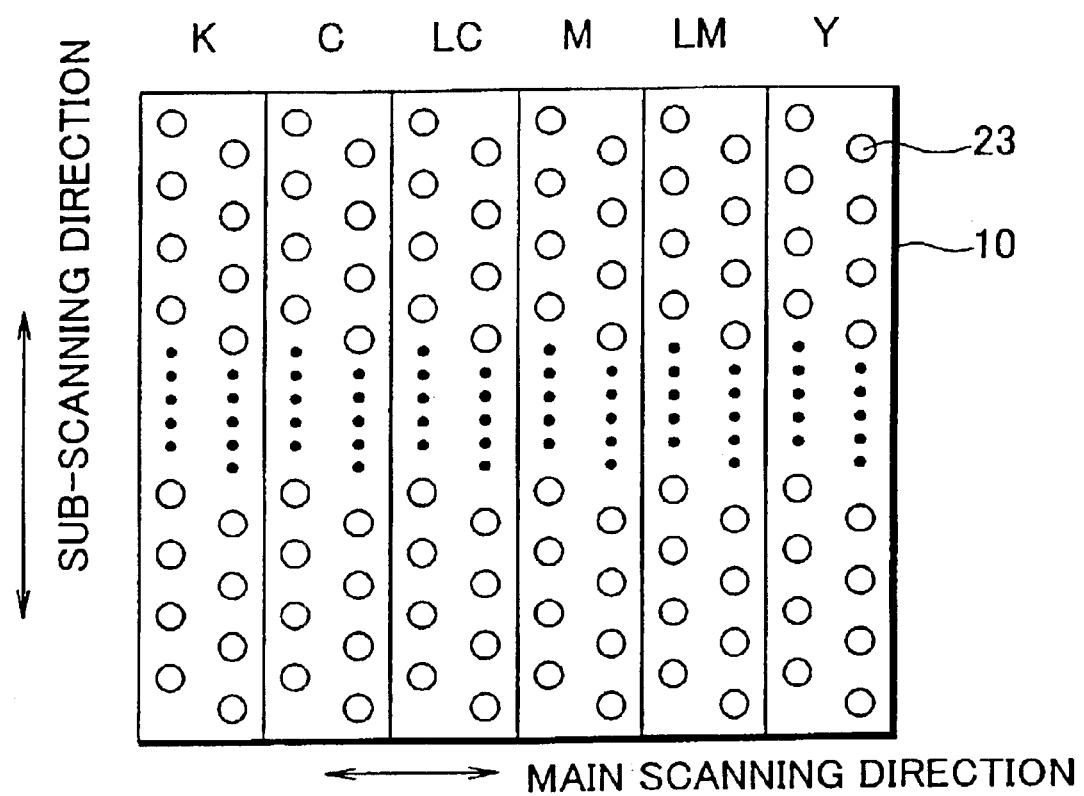
FIG. 7 shows a layout of nozzle openings 23 formed on the print head 10 in the embodiment.

Referring back to FIG. 4, the driving circuit 230 includes a shift register circuit 13 that converts serially transferred data to parallel data corresponding to the respective nozzles, a latch circuit 14 that holds the output of the shift register circuit 13 for a predetermined time period, a level shifter circuit 15 that amplifies the output of the latch circuit 14 to a voltage level of several tens volts, and a nozzle selection circuit (analog switch) 16 that is operated in response to the output of the level shifter circuit 15. The driving signal COM output from the driving signal generator circuit 48 connects with the input of the nozzle selection circuit 16. The output of the nozzle selection circuit 16 connects with a plurality of piezoelectric vibrators 17 provided on the print head 10, in order to control ejection of ink from corresponding nozzle openings 23 formed on the lower part of the print head 10. The shift register circuit 13, the latch circuit 14, the level shifter circuit 15, and the nozzle selection circuit 16 respectively include a plurality of elements corresponding to the number of piezoelectric vibrators 17 mounted on the print head 10. This is shown in FIG. 6. There are a large number of nozzle openings 23 set for each ink on the print head 10 as shown in FIG. 7, and one piezoelectric vibrator 17 is allocated to each nozzle opening 23. The print head 10 has a plurality of nozzle arrays respectively corresponding to the black ink (K), the cyan ink (C), the light cyan ink (LC), the magenta ink (M), the light magenta ink (LM), and the yellow ink (Y). Each nozzle array includes the nozzle openings 23 arranged in two lines and zigzag.

As shown in FIG. 6, the shift register circuit 13 includes shift registers 13A through 13N, the latch circuit 14 includes latches 14A through 14N, the level shifter circuit 15 includes level shifters 15A through 15N, and the nozzle selection circuit 16 includes switching elements 16A through 16N, all corresponding to piezoelectric vibrators 17A through 17N allocated to the respective nozzle openings 23. The driving circuit 230 receives the recording data S1 output from the print controller 40. The recording data S1 has either a value '1' or a value '0' that represents whether or not an ink droplet should be ejected from each nozzle opening 23. The driving circuit 230 successively transfers the recording data S1 to the shift registers 13A through 13N synchronously with the clock signal CLK. When the recording data S1 of one recording cycle with regard to all the nozzle openings 23 are transferred, bit data of either '1' or '0' are set in all the shift registers 13A through 13N. In response to the output of the latch signal LAT in this state, the bit data set in the respective shift registers 13A through 13N are transferred to the respective latches 14A through 14N. The shift register circuit 13 and the latch circuit 14 are collectively referred to as a data holding circuit 130.

While the respective latches 14A through 14N included in the latch circuit 14 hold data, the shift register circuit 13 receives a next set of transferred recording data S1 of a subsequent recording cycle. The output voltages of the latch circuit 14 are converted by the respective level shifters 15A through 15N of the level shifter circuit 15 and output to the respective switching elements 16A through 16N.

In the case where the outputs of the level shifters 15A through 15N are at the high level (that is, the bit data '1'), the respective switching elements 16A through 16N of the nozzle selection circuit 16 constructed as the analog switch are set in the 'ON' position. The switching elements 16A through 16N corresponding to the level shifters 15A through 15N having the outputs of the level data '1' cause the driving signal COM, which is output at a specific timing, to be transmitted to the corresponding piezoelectric vibrators 17A through 17N. The piezoelectric vibrators 17A through 17N receiving the driving signal COM are displaced according to the waveform of the driving signal COM. Each pressure chamber 32 on the print head 10 is then compressed to apply a pressure to the ink in the pressure chamber 32, so as to cause an ink droplet to be ejected from the corresponding nozzle opening 23.

In the case where the outputs of the level shifters 15A through 15N are at the low level (that is, the bit data '0'), the respective switching elements 16A through 16N are set in the 'OFF' position. This cuts off the transmission of the driving signal COM to the respective piezoelectric vibrators 17A through 17N, which accordingly keep the previous electric charges. No ink droplet is thus ejected from the corresponding nozzle opening 23.

When the selection control signal SSL output from the parallel input-output interface 49 is at the lower level, on the other hand, the four signal lines connect the parallel input-output interface 49 of the print controller 40 with the control IC 200 via the transfer controller 220. The print controller 40 thus carries out data transmission to and from the control IC 200 by serial communication. The four signal lines between the parallel input-output interface 49 and the control IC 200 include the receiving signal line RxD, through which the control IC 200 receives data, the transmitting signal line TxD, through which the control IC 200 outputs data, the power down signal line NMI, through which the print controller 40 outputs a requirement of writing operation at the time of power failure to the control IC 200, and the selection signal line SEL that allows transmission of data through either the signal line RxD or the signal line TxD. The controller 46 transmits required data to and from the control IC 200 using these four signals. The speed of communication between the controller 46 and the control IC 200 is sufficiently higher than the speed of data transmission between the control IC 200 and the storage elements 80. The power down signal NMI is output when the power switch 92a on the switch panel 92 is operated, when the cartridge switch 92b on the switch panel 92 is operated, and when the power supply is forcibly cut off by pulling the power plug out of the socket.

In response to the selection control signal SSL at the low level, the print controller 40 connects with the control IC 200 via the transfer controller 230 by serial communication and transfers information relating to the ink cartridges 107K and 107F, for example, information on the quantities of inks in the ink cartridges 107K and 107F, to the control IC 200. The control IC 200 temporarily registers the input information in the RAM 210 and writes the information into the respective storage elements 80 of the ink cartridges 107K and 107F at a predetermined timing, for example, at the timing of an output of the power down signal NMI.

The control IC 200 has a function of separately transmitting data to and from the two storage elements 80 mounted on the ink cartridges 107K and 107F as shown in FIG. 5. Namely one control IC 200 attains data transmission to and from the respective storage elements 80 of the black ink cartridge 107K and the color ink cartridge 107F. In the illustration of FIG. 5, in order to discriminate the signal lines to the respective storage elements 80, a suffix '1' is added to a power source line Power and respective signals CS, W/R, DATA, and CLK with regard to the black ink cartridge 107K and a suffix '2' is added with regard to the color ink cartridge 107F.

In the embodiment of the above arrangement, the writing operation of data into the storage elements 80 of the ink cartridges 107K and 107F is carried out with the power down signal NMI output, for example, in response to an operation of the power switch 92a on the switch panel 92. The writing operation of data into the storage elements 80 may alternatively be carried out with a command output through the receiving signal line RxD. In the latter case, the required number of signal lines between the transfer controller 220 and the control IC 200 may be reduced to three. The driving signal COM among the signal lines output to the driving circuit 230 maybe output directly from the parallel input-output interface 49 to the driving circuit 230. In this modified arrangement, both the signal lines between the transfer controller 220 and the control IC 200 and the signal lines between the transfer controller 220 and the driving circuit 230 may be reduced in number to three. This enables the signal line SG4 connecting with the transfer controller 220 via the FFC 300 to be omitted.

(Structure of Storage Elements 80)

Figure 8:
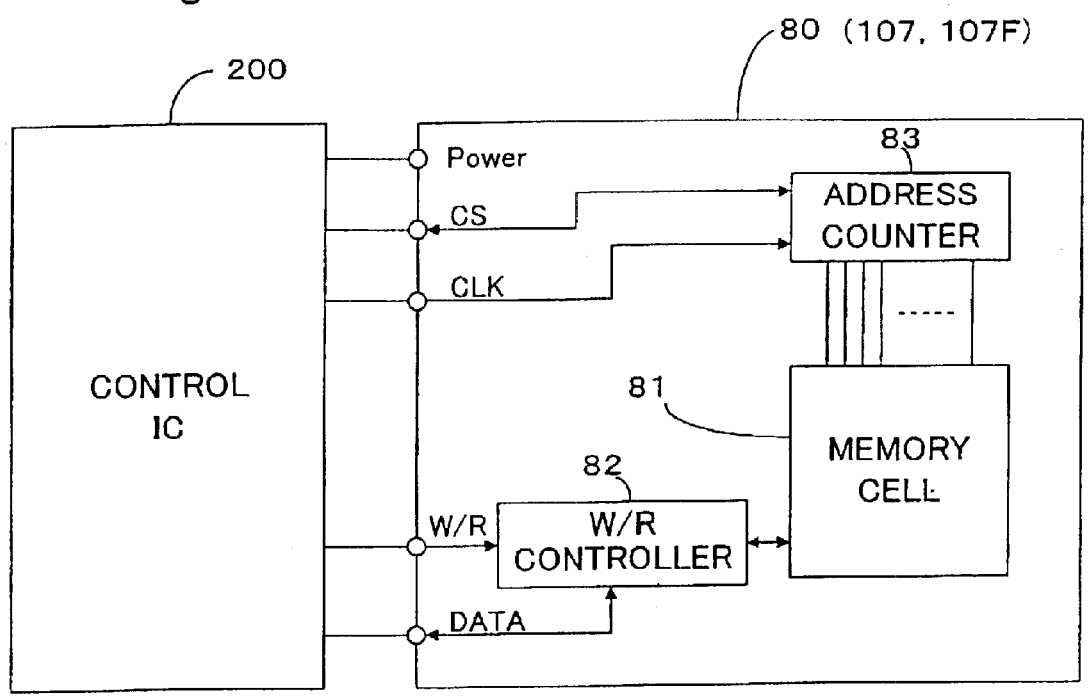
FIG. 8 is a block diagram showing the structure of a storage element 80 incorporated in black and color ink cartridges 107K and 107F.

FIG. 8 is a block diagram showing the configuration of the storage elements 80 Incorporated in the ink cartridges 107K and 107F attached to the ink jet printer 1 of the embodiment. The storage element 80 of the ink cartridges 107K and 107F includes a memory cell 81, a write/read controller 82, and an address counter 83. The write/read controller 82 is a circuit that controls writing and reading operations of data into and from the memory cell 81. The address counter 83 counts up in response to the clock signal CLK and generates an output that represents an address with regard to the memory cell 81.

Figure 9A:
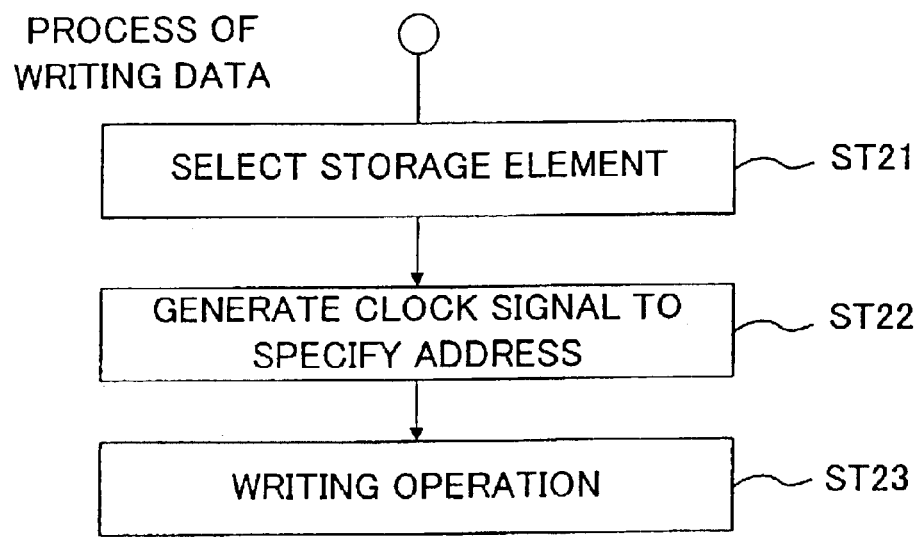
FIG. 9A is a flowchart showing a processing routine to write data into the storage element 80.
Figure 9B:
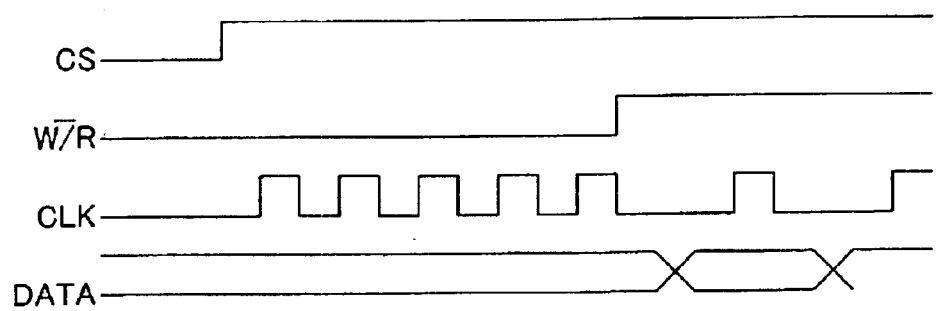
FIG. 9B is a timing chart showing the timing of execution of the processing shown in the flowchart of FIG. 9A.

The actual procedure of writing operation is described with reference to FIGS. 9A and 9B. FIG. 9A is a flowchart showing a processing routine executed by the print controller 40 in the printer 1 of the embodiment to write the remaining quantities of inks into the storage elements 80 incorporated in the black and color ink cartridges 107K and 107F, and FIG. 9B is a timing chart showing the timing of execution of the processing shown in the flowchart of FIG. 9A.

The controller 46 of the print controller 40 first makes a chip select signal CS, which sets the storage element 80 In an enabling state, in a high level at step ST21. While the chip select signal CS is kept at the low level, the count on the address counter 83 is set equal to zero. When the chip select signal CS is set to the high level, the address counter 83 is enabled to start the count. The controller 46 then generates a required number of pulses of the clock signal CLK to specify an address, at which data are written, at step ST22 The control IC 200 determines the required number of pulses of the clock signal CLK. In this meaning, the control IC 200 functions as an address decoder that converts the format of addressing in the EEPROM 90 into the format of addressing in the storage elements 80. The address counter 83 included in the storage element 80 counts up in response to the required number of pulses of the clock signal CLK thus generated. During this process, a write/read signal W/R is kept in a low level. This means that an instruction of reading data is given to the memory cell 81. Dummy data are accordingly read synchronously with the output clock signal CLK.

After the address counter 83 counts up to the specified address for writing data, the controller 46 carries out an actual writing operation at step ST23. The writing operation switches the write/read signal W/R to the high level, outputs one-bit data to a data terminal I/O, and changes the clock signal CLK to a high active state on the completion of data output. While the write/read signal W/R is in the high level, data DATA of the data terminal I/O are written into the memory cell 81 of the storage element 80 synchronously with a rise of the clock signal CLK. Although the writing operation starts synchronously with a fifth pulse of the clock signal CLK in the example of FIG. 9B, this only describes the general writing procedure. The writing operation of required data, for example, the remaining quantity of ink, may be carried out at any pulse, for example, at a first pulse, of the clock signal CLK according to the requirements.

Data arrays of the storage elements 80, in which data are written, are described with reference to FIGS. 10 and 11. FIG. 10 shows a data array in the storage element 80 incorporated in the black ink cartridge 107K attached to the printer 1 of this embodiment shown in FIG. 1. FIG. 11 shows a data array in the storage element 80 incorporated in the color ink cartridge 107F attached to the printer 1. FIG. 12 shows a data array in the EEPROM 90 incorporated in the print controller 40 of the printer main body 100.

Referring to FIG. 10, the memory cell 81 of the storage element 80 incorporated in the black ink cartridge 107K has a first storage area 750, in which read only data are stored, and a second storage area 760, in which rewritable data are stored. The printer main body 100 can only read the data stored in the first storage area 750, while performing both the reading and writing operations with regard to the data stored in the second storage area 760. The second storage area 760 is located at a specific address, which is accessed prior to the first storage area 750 in the state without no specific processing, that is, in the case of default. Namely the second storage area 760 has a lower address than that of the first storage area 750. In the specification hereof, the expression 'lower address' means an address closer to the head of the memory space.

In the second storage area 760, data regarding the frequency of attachment of the ink cartridge is registered in a head portion 700 thereof. First data on the remaining quantity of black ink and second data on the remaining quantity of black ink are respectively allocated to first and second black ink remaining quantity memory divisions 701 and 702, which follow the head portion 700 and are accessed in this order.

The two black in remaining quantity memory divisions 701 and 702 are provided for storing the data on the remaining quantity of black ink. This arrangement enables the data on the remaining quantity of black ink to be written alternately in these two memory divisions 701 and 702. If the latest data on the remaining quantity of black ink is stored in the first black ink remaining quantity memory division 701, the data on the remaining quantity of black ink stored in the second black ink remaining quantity memory division 702 is the previous data immediately before the latest data, and the next writing operation is performed in the second black ink remaining quantity memory division 702.

Both the first and second black ink remaining quantity memory divisions 701 and 702 have a storage capacity of 1 byte or 8 bits. Another preferable application allocates the data on the remaining quantity of black ink to a certain address that is accessed prior to the data on the frequency of attachment of the ink cartridge in the storage element 80 of the black ink cartridge 107K. This arrangement enables the data on the remaining quantity of black ink to be accessed first, for example, in the case of a power-off time discussed later.

The read only data stored in the first storage area 750 include data on the time (year) of unsealing the ink cartridge 107K, data on the time (month) of unsealing the ink cartridge 107K, version data of the ink cartridge 107K, data on the type of ink, for example, a pigment or a dye, data on the year of manufacture of the ink cartridge 107K, data on the month of manufacture of the ink cartridge 107K, data on the date of manufacture of the ink cartridge 107K, data on the production line of the ink cartridge 107K, serial number data of the ink cartridge 107K, and data on the recycle showing whether the ink cartridge 107K is brand-new or recycled, which are respectively allocated to memory divisions 711 through 720 that are accessed in this order.

An intrinsic value is set to the serial number of each ink cartridge 107K, which is accordingly utilized as ID (identification) information. In the case where the data on the year of manufacture, the month of manufacture, the date of manufacture, and the time of manufacture represent the precise time when a certain ink cartridge 107K has been manufactured (for ex ample, to the unit of second or even 0.1 second), such data may be utilized as ID information.

Referring to FIG. 11, the memory cell 81 of the storage element 80 incorporated in the color ink cartridge 107F has a first storage area 650, in which read only data are stored, and a second storage area 660, in which rewritable data are stored. The printer main body 100 can only read the data stored in the first storage area 650, while performing both the reading and writing operations with regard to the data stored in the second storage area 660. The second storage area 660 is located at a specific address that is accessed prior to the first storage area 650. Namely the second storage area 660 has a lower address (that is, an address closer to the head) than that of the first storage area 650.

In the second storage area 660, data regarding the frequency of attachment of the ink cartridge is registered in a head portion 600 thereof. First data on the remaining quantity of cyan ink, second data on the remaining quantity of cyan ink, first data on the remaining quantity of magenta ink, second data on the remaining quantity of magenta ink, first data on the remaining quantity of yellow ink, second data on the remaining quantity of yellow ink, first data on the remaining quantity of light cyan ink, second data on the remaining quantity of light cyan ink, first data on the remaining quantity of light magenta ink, and second data on the remaining quantity of light magenta ink are respectively allocated to color ink remaining quantity memory divisions 601 through 610, which follow the head portion 600 and are accessed in this order.

In the same manner as the black ink cartridge 107K, there are the two memory divisions, that is, the first color ink remaining quantity memory division 601 (603, 605, 607, 609) and the second color ink remaining quantity memory division 602 (604, 606, 608, 610), for storing the data on the remaining quantity of each color ink. This arrangement enables the data on the remaining quantity of each color ink to be rewritten alternately in these two memory divisions.

Like the black ink cartridge 107K, both the first and second color ink remaining quantity memory divisions with regard to each color ink in the color ink cartridge 107F have a storage capacity of 1 byte or 8 bits. As discussed above with regard to the storage element 80 of the black ink cartridge 107K, another preferable application allocates the data on the remaining quantities of respective color inks to certain addresses that are accessed prior to the data on the frequency of attachment of the ink cartridge in the storage element 80 of the color ink cartridge 107F. This arrangement enables the data on the remaining quantities of respective color inks to be accessed first, for example, in the case of a power-off time discussed later.

Like the black ink cartridge 107K, the read only data stored in the first storage area 650 include data on the time (year) of unsealing the ink cartridge 107F, data on the time (month) of unsealing the ink cartridge 107F, version data of the ink cartridge 107F, data on the type of ink, data on the year of manufacture of the ink cartridge 107F, data on the month of manufacture of the ink cartridge 107F, data on the date of manufacture of the ink cartridge 107F, data on the production line, serial number data, and data on the recycle that are respectively allocated to memory divisions 611 through 620, which are accessed in this order. These data are common to all the color inks, so that only one set of data are provided and stored as common data to all the color inks. As discussed above with regard to the black ink cartridge 107K, the serial number data may be usable as the ID information.

When the power source 91 of the printer 1 is turned on after the ink cartridges 107K and 107F are attached to the printer main body 100, these data are accessed and utilized by the print controller 40, and may be stored into the EEPROM 90 incorporated in the printer main body 100 as occasions demand. As shown in FIG. 12, memory divisions 801 through 835 in the EEPROM 90 store all the data stored in the respective storage elements 80 including the remaining quantities of the respective inks in the black ink cartridge 107K and the color ink cartridge 107F.

The EEPROM 90 has a plurality of memory divisions, in which the data on the remaining quantity of black ink, the other data relating to the black ink cartridge 107K, the data on the remaining quantities of respective color inks, and the other data relating to the color ink cartridge 107F are stored, as shown in FIG. 12. These data correspond to those stored in the respective storage elements 80 of the black ink cartridge 107K and the color ink cartridge 107F. The difference is that the data on the remaining quantity of each ink has a data length of 32 bits or 4 bytes in the EEPROM 90.

(Processing with Regard to Remaining Quantities of Inks Executed in Printer 1)

The printer 1 of the embodiment determines the amount of ink consumption by calculation. The calculation of the amount of ink consumption may be carried out by the printer driver incorporated in the computer PC or by the printer 1. The calculation of the amount of ink consumption is performed by taking into account the following two factors:

(1) Amount of Ink Consumption by Printing an Image:

In order to accurately calculate the amount of ink consumption in the process of printing, image data are subjected to color conversion and binarization processes and converted to on-off data of ink dots. With regard to the image data in the on condition of ink dots, the weight of each dot is multiplied with the number of dots. Namely the frequency of ejection of ink droplets from the nozzle openings 23 is multiplied by the weight of each ink droplet. The amount of ink consumption may be approximated from the densities of the respective pixels included in the image data.

(2) Amount of Ink Consumption by Cleaning the Print Head 10:

The amount of ink consumption by cleaning the print head 10 includes an amount of ink ejection by the flushing operation and an amount of ink suction by the sucking operation. The action of the flushing operation is identical with the normal ejection of ink droplets, and the amount of ink ejection by the flushing operation is thus calculated in the same manner as described in the factor (1). The amount of ink consumption by the sucking operation is stored in advance according to the revolving speed and the activation time of the sucking pump. The amount of ink consumed by one sucking action is generally measured and stored in advance.

The current remaining quantity of ink is determined by subtracting the calculated amount of ink consumption from the previous remaining quantity of ink prior to the current printing operation. The controller 46 carries out the calculation of the remaining quantity of ink according to a specific program, for example, one stored in the ROM 45, using data stored in the EEPROM 90.

In the arrangement of this embodiment, the color conversion and binarization processes are performed by the printer driver in the computer PC as described previously. The printer 1 thus receives the binary data, that is, the data on the dot on-off conditions with regard to each ink. The printer 1 multiplies the weight of ink for each dot (that is, the weight of each ink droplet) by the number of dots to determine the amount of ink consumption, based on the input binary data.

The ink jet printer 1 of the embodiment receives the binary data as described previously. The array of the binary data is, however, not coincident with the nozzle array on the print head 10. The controller 46 accordingly divides the RAM 44 into three portions, that is, an input buffer 44A, an intermediate buffer 44B, and an output buffer 44C (see FIG. 4), in order to perform the rearrangement of the dot data array. The ink jet printer 1 may alternatively carry out the required processing for the color conversion and the binarization. In this case, the ink jet printer 1 registers the print data, which include the multi-tone information and are transmitted from the computer PC, into the input buffer 44A via the interface 43. The print data kept in the input buffer 44A are subjected to command analysis and then transmitted to the intermediate buffer 44B. The controller 46 converts the input print data into intermediate codes by supplying information regarding the printing positions of the respective letters or characters, the type of modification, the size of the letters or characters, and the font address. The intermediate codes are kept in the intermediate buffer 44B. The controller 46 then analyzes the intermediate codes kept in the intermediate buffer 44B and decodes the intermediate codes into binary dot pattern data. The binary dot pattern data are expanded and stored in the output buffer 44C.

In any case, when dot pattern data corresponding to one scan of the print head 10 are obtained, the dot pattern data are serially transferred from the output buffer 44C to the print head 10 via the parallel input-output interface 49. After the dot pattern data corresponding to one scan of the print head 10 are output from the output buffer 44C, the process erases the contents of the intermediate buffer 44B to wait for conversion of a next set of print data.

The print head 10 causes the respective nozzle openings 23 to eject ink droplets against the printing medium at a predetermined timing, so as to create an image corresponding to the input dot pattern data on the printing medium. Referring to FIG. 4, the driving signal COM generated in the driving signal generator circuit 48 is output to the driving circuit 230 via the parallel input-output interface 49 and the transfer controller 220 as discussed previously. The print head 10 has a plurality of pressure chambers 32 and the plurality of piezoelectric vibrators 17 (pressure-generating elements) respectively connecting with the nozzle openings 23. The number of both the pressure chambers 32 and the piezoelectric vibrators 17 is thus coincident with the number of the nozzle openings 23. When the driving signal COM is sent from the driving circuit 230 to a certain piezoelectric vibrator 17, the corresponding pressure chamber 32 is contracted to cause the corresponding nozzle opening 23 to eject an ink droplet.

The process of attaching the ink cartridge 107K to the cartridge attachment unit 18 is described with referring again to FIGS. 2A, 2B, and 3. When the user operates the cartridge switch 92b on the switch panel 92 to give an instruction of replacing the ink cartridge 107K, the carriage 101 shifts to a specific position that allows replacement of the ink cartridge 107K. The procedure of replacement first detaches the ink cartridge 107K currently attached to the printer 1. A lever 192 is fixed to a rear wall 188 of the cartridge attachment unit 18 via a support shaft 191 as shown in FIG. 3. The user pulls up the lever 192 to a release position, at which the ink cartridge 107K can be detached from the cartridge attachment unit 18. Another ink cartridge 107K is then located on the cartridge attachment unit 18, and the lever 192 is pressed down to a fixation position, which is over the ink cartridge 107K. The press-down motion of the lever 192 presses the ink cartridge 107K downward, so as to make the ink supply unit 175 fitted into the recess 183 and make the needle 181 pierce the ink supply unit 175, thereby enabling a supply of ink. As the lever 192 is further pressed down, a clutch 193 disposed on a free end of the lever 192 engages with a mating element 189 disposed on the cartridge attachment unit 18. This securely fixes the ink cartridge 107K to the cartridge attachment unit 18. In this state, the plurality of connection terminals 174 on the storage element 80 in the ink cartridge 107K electrically connect with the plurality of electrodes 185 on the cartridge attachment unit 18. This enables transmission of data between the printer main body 100 and the storage element 80. When the replacement of the ink cartridge 107K is completed and the user operates the switch panel 92 again, the carriage 101 returns to the initial position to be in the printable state.

The color ink cartridge 107F basically has a similar structure to that of the ink cartridge 107K, and only the difference is described here. The color ink cartridge 107F has five ink chambers in which five different color inks are kept. It is required to feed the supplies of the respective color inks to the print head 10 via separate pathways. The color ink cartridge 107F accordingly has five ink supply units 175, which respectively correspond to the five different color inks. The color ink cartridge 107F, in which five different color inks are kept, however, has only one storage element 80 incorporated therein. Pieces of information regarding the ink cartridge 107F and the five different color inks are collectively stored in this storage element 80.

(Transmission of Information Between Ink Cartridge 107 and Printer 1)

Figure 13:
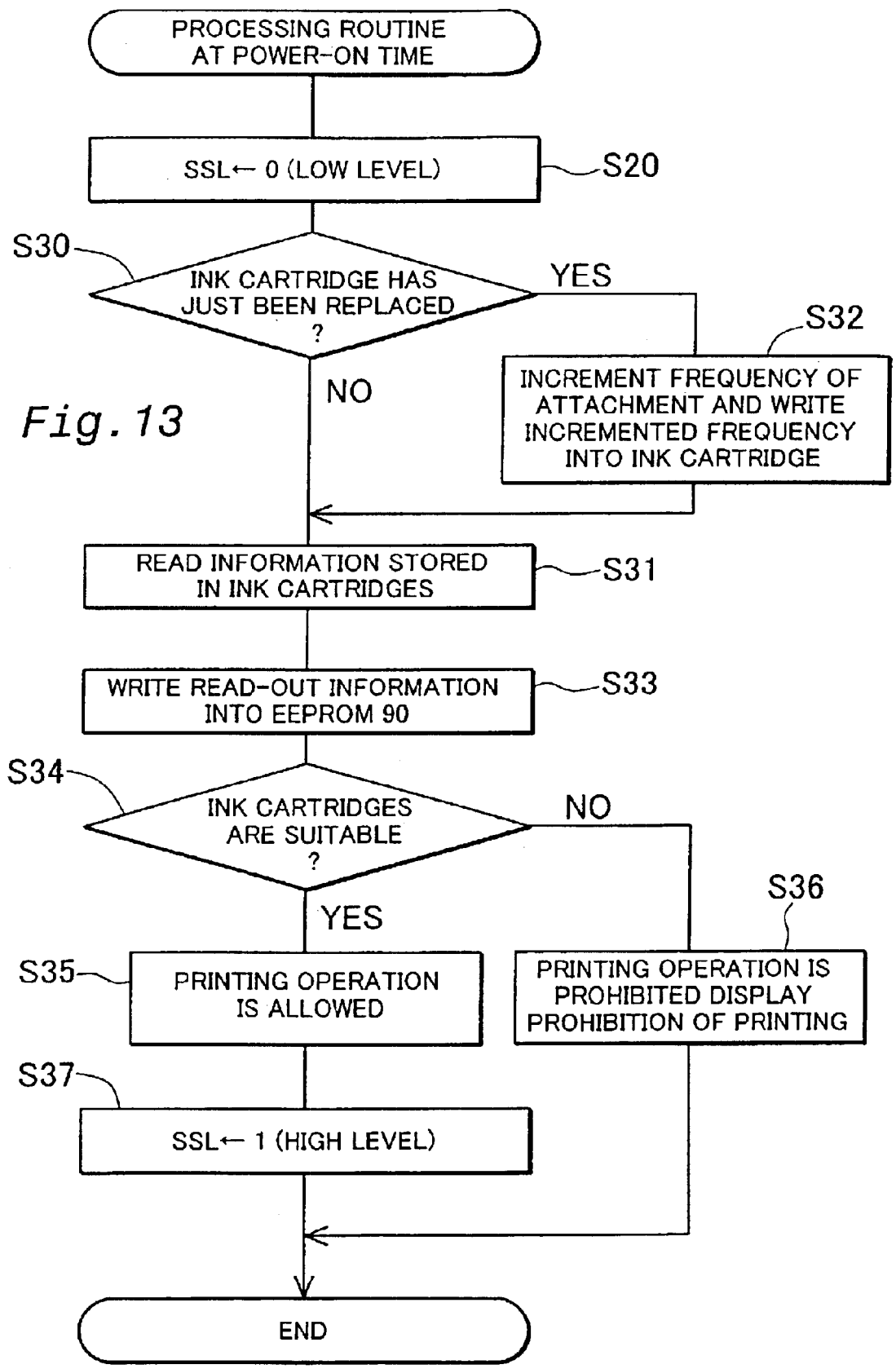
FIG. 13 is a flowchart showing a processing routine executed at a time of power supply to the printer 1.
Figure 14:
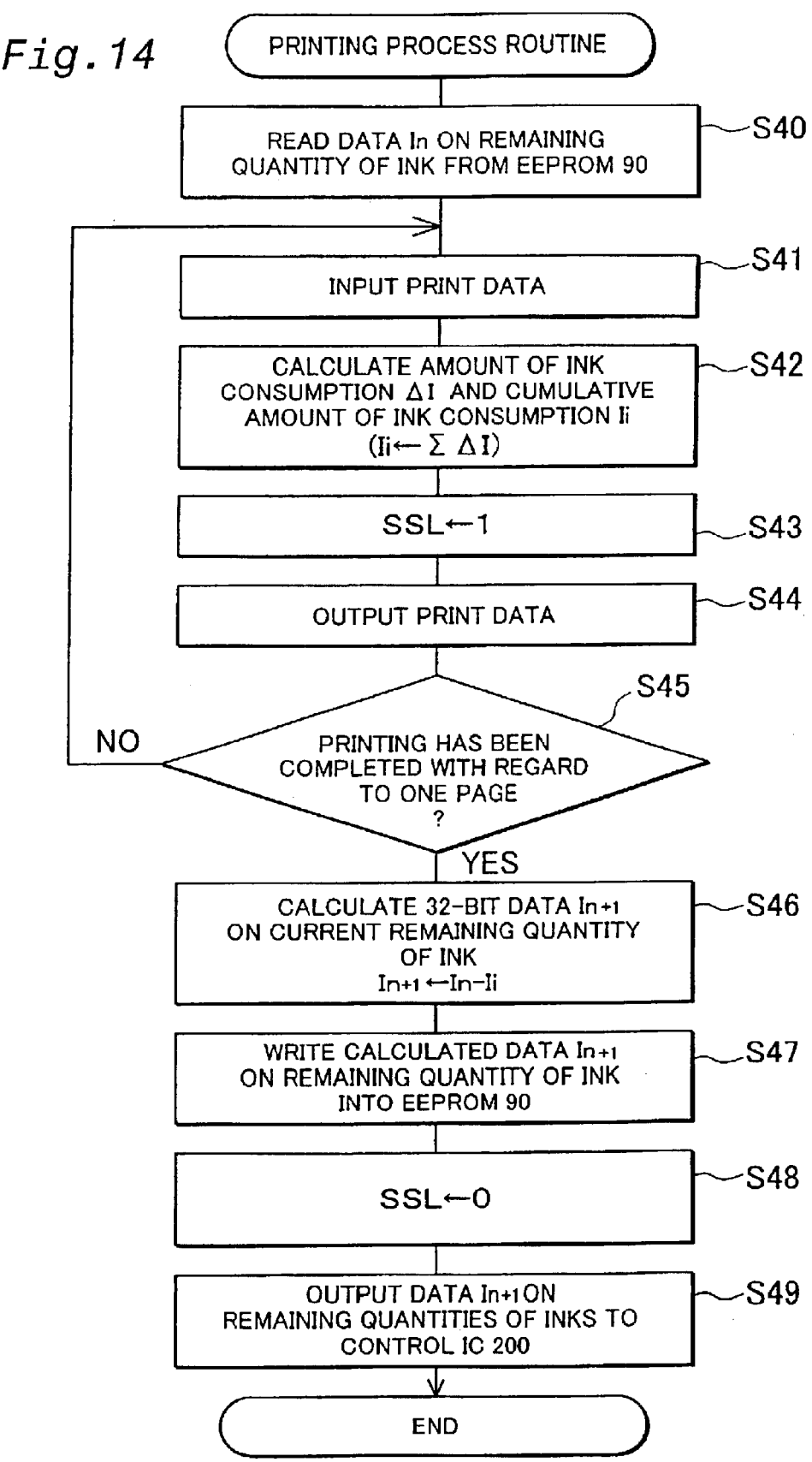
FIG. 14 is a flowchart showing a processing routine executed to calculate the remaining quantities of inks.
Figure 15:
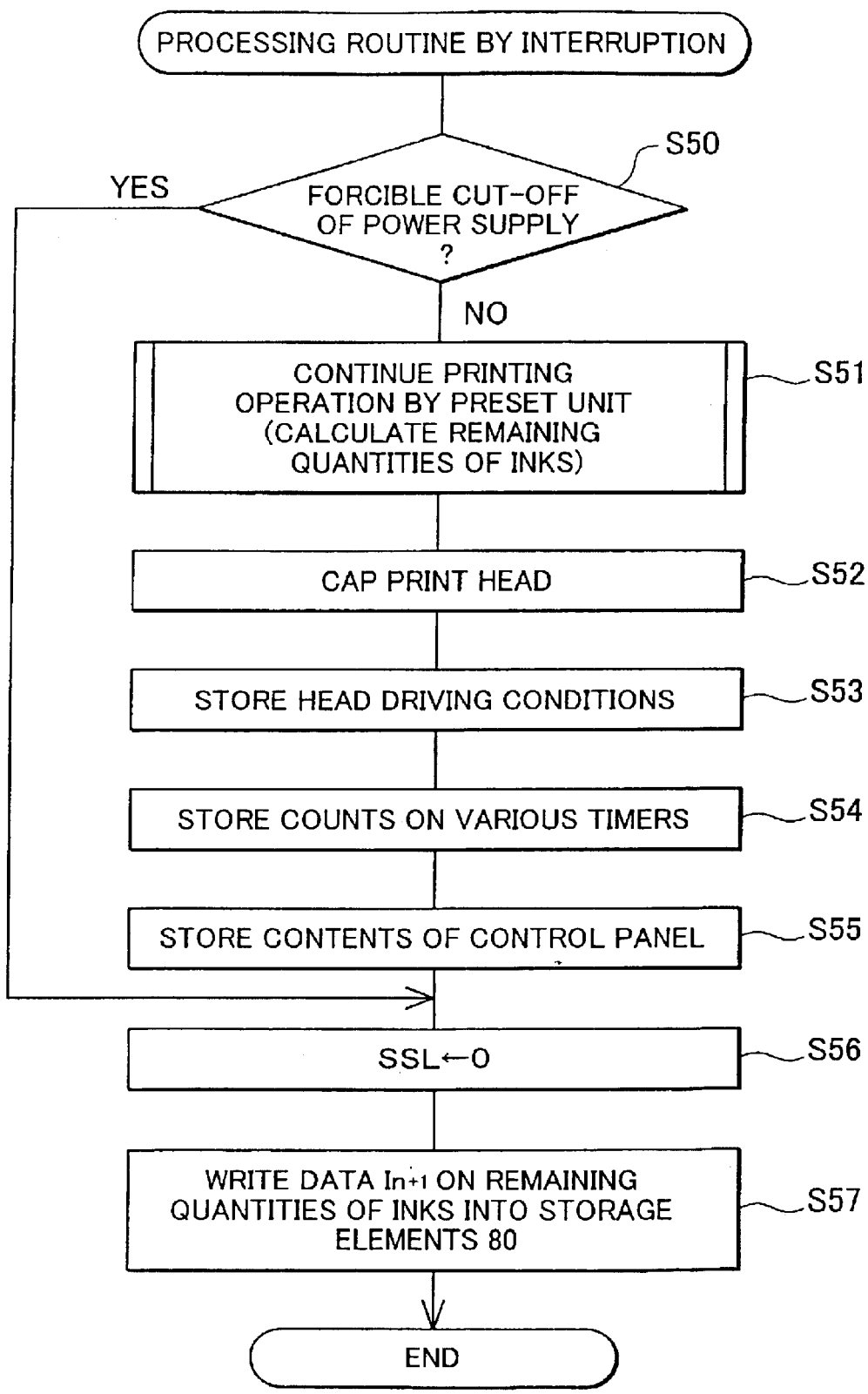
FIG. 15 is a flowchart showing a processing routine executed by interruption in response to a requirement of power-off.

The following describes a series of basic processing carried out by the ink jet printer 1 of the embodiment from a power-on time to a power-off time of the printer 1 and details of data transmission between the carriage 101 and the print controller 40 with referring to the flowcharts of FIGS. 13 through 15. FIG. 13 is a flowchart showing a processing routine executed at a time of power supply to the printer 1. FIG. 14 is a flowchart showing a processing routine executed to calculate the remaining quantities of inks. FIG. 15 is a flowchart showing a processing routine executed at a power-off time of the printer 1.

The controller 46 executes the processing routine of FIG. 13 immediately after the start of power supply. When the power source 91 of the printer 1 is turned on, the controller 46 first sets the selection control signal SSL output from the parallel input-output interface 49 in the low level (that is, the bit data '0') at step S20. This step enables the parallel input-output interface 49 to communicate with the control IC 200, in order to wait for the data transmission to and from the storage elements 80 of the ink cartridges 107K and 107F.

The controller 46 then determines whether or not the ink cartridge 107K or 107F has just been replaced at step S30. The decision of step S30 is carried out, for example, by referring to an ink cartridge replacement flag in the case where the EEPROM 90 has the ink cartridge replacement flag, or in another example, based on data relating to the time (hour and minute) of manufacture or the production serial number with regard to the ink cartridge 107K or 107F. In the case of power-on without replacement of the ink cartridges 107K and 107F, that is, in the case of a negative answer at step S30, the controller 46 reads the data from the respective storage elements 80 of the ink cartridges 107K and 107F at step S31.

When it is determined that the ink cartridge 107K or 107F has just been replaced, that is, in the case of an affirmative answer at step S30, on the other hand, the controller 46 increments the frequency of attachment by one and writes the incremented frequency of attachment into the storage element 80 of the ink cartridge 107K or 107F at step S32. The controller 46 then reads the data from the respective storage elements 80 of the ink cartridges 107K and 107F at step S31. The controller 46 subsequently writes the read-out data at preset addresses in the EEPROM 90 at step S33. At subsequent step S34, the controller 46 determines whether or not the ink cartridges 107K and 107F attached to the ink jet printer 1 are suitable for the ink jet printer 1, based on the data stored in the EEPROM 90. When suitable, that is, in the case of an affirmative answer at step S34, a printing operation is allowed at step S35 and the selection control signal SSL output from the parallel input-output interface 49 is set in the high level (that is, the bit data '1') at step S37. This completes the preparation for printing, and the program exits from the processing routine of FIG. 13. When not suitable, that is, in the case of a negative answer at step S34, on the contrary, the printing operation is not allowed, and information representing the prohibition of printing is displayed on either the switch panel 92 or the display MT at step S36.

In the case where the printing operation is allowed at step S35, the printer 1 carries out a predetermined printing process in response to a printing instruction output from the computer PC. At this moment, the controller 46 transfers print data to the print head 10 and calculates the remaining quantity of each ink. The processing routine executed in this state is described with reference to the flowchart of FIG. 14. When the program enters the printing process routine shown in FIG. 14, the controller 46 first reads data In on the remaining quantity of each ink from the EEPROM 90 incorporated in the print controller 40 at step S40. The data In is written on completion of the previous cycle of printing operation and represents the latest remaining quantity of each ink. The controller 46 then inputs print data from the computer PC at step S41. In the structure of this embodiment, the required image processing like color conversion and binarization is all carried out by the computer PC, and the printer 1 receives the binary data with regard to a predetermined number of raster lines, that is, the on-off data of ink dots. The controller 46 subsequently calculates an amount of ink consumption $\Delta I$ and a cumulative amount of ink consumption $Ii$, based on the input print data at step S42. The amount of ink consumption $\Delta I$ calculated here reflects not only the amount of ink consumption corresponding to the print data with regard to the predetermined number of raster lines input from the computer PC but also the amount of ink consumption by the head cleaning action including the flushing operation and the sucking operation. By way of example, the procedure of calculation multiplies the frequency of ejection of ink droplets by the weight of each ink droplet to calculate the quantity of ink ejection with regard to each ink, and adds the amount of ink consumption by the flushing operation and the sucking operation to the calculated quantity of ink ejection, so as to determine the amount of ink consumption ΔI.

The cumulative amount of ink consumption Ii can readily be computed from the amounts of ink consumption ΔI thus calculated. The typical procedure of computation sums up the amounts of ink consumption ΔI successively calculated according to the print data, so as to determine the cumulative amount of ink consumption Ii. The controller 46 then sets the selection control signal SSL output from the parallel input-output interface 49 in the high level at step S43. This step enables the signals from the parallel input-output interface 49 to be output to the driving circuit 230 via the transfer controller 220. At subsequent step S44, the controller 46 converts the input print data to appropriate data suitable for the layout of the nozzle openings 23 on the print head 10 and the ejection timing and outputs the converted print data to the print head 10.

When the processing of the input print data with regard to the predetermined number of raster lines is concluded, the controller determines whether or not the printing operation has been completed with regard to one page at step S45. In the case where the printing operation with regard to one page has not yet been completed, that is, in the case of a negative answer at step S45, the program returns to step S41 and repeats the processing of and after step S41 to input and process a next set of print data. In the case where the printing operation with regard to one page has been completed, that is, in the case of an affirmative answer at step S45, on the other hand, the program calculates the current remaining quantity of each ink In+1 at S46, and writes the current remaining quantity of ink In+1 thus calculated into the EEPROM 90 at step S47. The current remaining quantity of ink In+1 is obtained by subtracting the cumulative amount of ink consumption Ii determined at step S43 from the previous remaining quantity of ink In read at step S40. The updated remaining quantity of ink In+1 is rewritten into the EEPROM 90.

The controller 46 then sets the selection control signal SSL output from the parallel input-output interface 49 in the low level at step S48. This step enables the parallel input-output interface 49 to communicate with the control IC 200 by serial communication. The latest data In+1 on the remaining quantities of inks are then output to the control IC 200 at step S49. The data on the remaining quantities of inks are not immediately written into the storage elements 80, but are temporarily kept in the RAM 210 under the control of the control IC 200.

The updated data on the remaining quantities of the respective inks are written into the storage elements 80 of the black ink cartridge 107K and the color ink cartridge 107F in response to the output of the power down instruction NMI. The power down instruction NMI is output at the following three timings as described previously:

(1) at the timing when the power switch 92a on the switch panel 92 of the printer 1 is operated to turn the power source 91 off;

(2) at the timing when the cartridge switch 92b on the switch panel 92 is operated to give an instruction of replacing the ink cartridge; and (3) at the timing when the power supply is forcibly cut off by pulling the power plug out of the socket.

With referring to the flowchart of FIG. 15, the process of storing the data on the remaining quantities of inks into the respective storage elements 80 of the ink cartridges 107K and 107F is described. The processing routine shown in the flowchart of FIG. 15 is activated by interruption in response to the output of the power down instruction NMI as described previously. When the program enters the processing routine of FIG. 15, it is first determined whether or not the cause of the interruption is forcible cut-off of the power supply (the timing (3) discussed above) at step S50. In the case where the cause of the interruption is the forcible cut-off of the power supply, that is, in the case of an affirmative answer at step S50, the allowable time is only little and the program accordingly skips the processing of steps S51 through S55 and immediately proceeds to step S56. At step S56, the controller 46 sets the selection control signal SSL output from the parallel input-output interface 49 in the low level, so as to enable the parallel input-output interface 49 to communicate with the control IC 200. The controller 46 then outputs the power down signal NMI to the control IC 200 at step S57. When receiving the power down signal NMI, the control IC 200 immediately writes the updated data In+1 on the remaining quantities of inks into the respective storage elements 80 of the ink cartridges 107K and 107F. The updated data In+1 on the remaining quantities of inks written into the storage element 80 have been calculated according to the processing routine of FIG. 14 and transmitted to the control IC 200. The technique discussed above is applied to write the data on the remaining quantities of inks into the respective storage elements 80 of the ink cartridges 107K and 107F. The data on the remaining quantities of inks are written and stored into the second storage areas 660 and 760 of the respective storage elements 80. Here the remaining quantity of each ink is alternately written into the two memory divisions allocated to the ink. In accordance with one possible application, the execution of the storage into each memory division may be identified by means of a flag, which is located at the head of each memory division and inverted on completion of the writing operation into the memory division. The control IC 200 carries out this control procedure.

In the case where the cause of the interruption is not the forcible cut-off of the power supply, that is, in the case of a negative answer at step S50, on the other hand, it is determined that the interruption is caused by either the operation of the power switch 92a on the switch panel 92 in the printer 1 to turn the power source 91 off or the operation of the cartridge switch 92b on the switch panel 92 to give an instruction of replacement of the ink cartridge. The program accordingly continues the printing operation in progress by a preset unit, for example, up to the end of one raster line, and calculates the remaining quantities of inks at step S51. The calculation is performed according to the flowchart of FIG. 14. The controller 46 then drives the capping unit 108 to cap the print head 10 at step S52, and stores the driving conditions of the print head 10 into the EEPROM 90 at step S53. The driving conditions here include a voltage of the driving signal to compensate for the individual difference of the print head and a condition of correction to compensate for the difference between the respective colors. The controller 46 subsequently stores counts on a variety of timers into the EEPROM 90 at step S54, and stores the contents of a control panel, for example, an adjustment value to correct the misalignment of hitting positions in the case of bi-directional printing, into the EEPROM 90 at step S55. After the processing of step S55, the program carries out the processing of steps S56 and S57 described above. Namely the controller 46 sets the selection control signal SSL in the low level at step S56, and writes the updated data In+1 on the remaining quantities of inks into the second storage areas 660 and 760 of the respective storage elements 80 of the ink cartridges 107K and 107F at step S57. In the case where the power switch 92a on the switch panel 92 of the printer 1 is operated to activate this interruptive processing routine of FIG. 15, after the writing operation of the remaining quantities of inks, a signal is output to the power source 91 to cut off the main power supply to the printer 1. In the case where the cartridge switch 92b on the switch panel 92 is operated to activate this interruptive processing routine of FIG. 15, after the writing operation, the carriage 101 shifts to a specific position for replacement of the ink cartridge. These processes are not specifically shown in the flowchart of FIG. 15.

(Effects of Embodiment)

In the arrangement of the embodiment discussed above, the printer 1 stores the information relating to the remaining quantities of inks in different formats of addressing in the EEPROM 90 and in the storage elements 80 of the ink cartridges 107K and 107F. Memories of adequate specifications are thus respectively applicable for the EEPROM 90 and the storage elements 80, based on the requirements of the storage capacity, the speed of writing and reading operations, and the number of signal lines. This effectively reduces the size of the ink cartridges 107K and 107F and attains the resource saving effect. The EEPROM of the serial access type is used for each storage element 80. This decreases the required number of signal lines in the storage element 80 and reduces the volume occupied by the signal lines, thereby reducing the size of the ink cartridges 107K and 107F. The control IC 200 mounted on the carriage 101 carries out the conversion of the format of addressing (8 bits, parallel) in the EEPROM 90 of the printer main body 100 into a different format of addressing, that is, the number of pulses of the clock signal CLK. The control IC 200 is disposed in the vicinity of the storage elements 80 that are serially accessed. This arrangement desirably shortens the length of the signal line connecting the control IC 200 with each storage element 80, thereby enhancing the reliability of data transmission.

In this embodiment, the control IC 200 carries out the conversion of the storage format of addressing. This arrangement favorably decreases the loading to the controller 46 included in the print controller 40. At the time of a forcible cut-off of power supply, for example, by pulling the power socket out of the plug, the only action required for the print controller 40 is to output the power down signal NMI. This extremely shortens the time period required for the processing. This advantage is extremely significant when only a limited time period is provided for the processing, for example, at the time of forcible cut-off of the power supply.

In this embodiment, the data on the remaining quantities of inks are stored independently with regard to the respective inks. The control IC 200 functioning as the address decoder carries out the conversion of the storage format of addressing corresponding to a plurality of areas provided for the respective inks in the storage elements 80. This arrangement enables data regarding an arbitrary ink to be immediately read from or written into the storage element 80 and to be immediately written into or read from the EEPROM 90. When an instruction is given to write data on the remaining quantities of inks, the control IC 200 carries out the conversion of the storage format of addressing, in order to specify one of two memory divisions alternately, which are provided for each ink in the storage element 80. Even if data stored in one of the memory divisions are destroyed, this configuration enables the processing to be carried out accurately using the data stored in the other memory division. This enhances the reliability of the processing with regard to the remaining quantities of inks.

The data on the remaining quantities of inks, which are finally written into the respective storage elements 80 of the ink cartridges 107K and 107F, are temporarily registered in the RAM 210 on the control board 205. This arrangement does not require the time-consuming process of reading the respective pieces of information from the EEPROM 90 and writing the pieces of information into the storage element 80 in response to each demand. This accordingly facilitates the writing operation of data into the storage elements 80 of the ink cartridges 107K and 107F. In this embodiment, the transmission of information between the print controller 40 and the storage elements 80 is implemented using the signal lines, through which the driving signal is transmitted to the respective piezoelectric vibrators 17 on the print head 10. This arrangement desirably simplifies the configuration of the signal lines between the print controller 40 and the carriage 101.

In this embodiment, the transfer controller 220 disposed on the control board 205 mounted on the carriage 101 specifies whether the input signal is to be transmitted to the driving circuit 230 or to be transmitted to the control IC 200. The print controller 40 is thus not in charge of the final transmission of information. This desirably simplifies the processing executed by the print controller 40.

The present invention is not restricted to the above embodiment, but there may be many modifications, changes, and alterations without departing from the scope or spirit of the main characteristics of the present invention. For example, ferroelectric memories (FROM) may replace the memory cells 81 in the storage elements 80 and the EEPROM 90.

Figure 16:
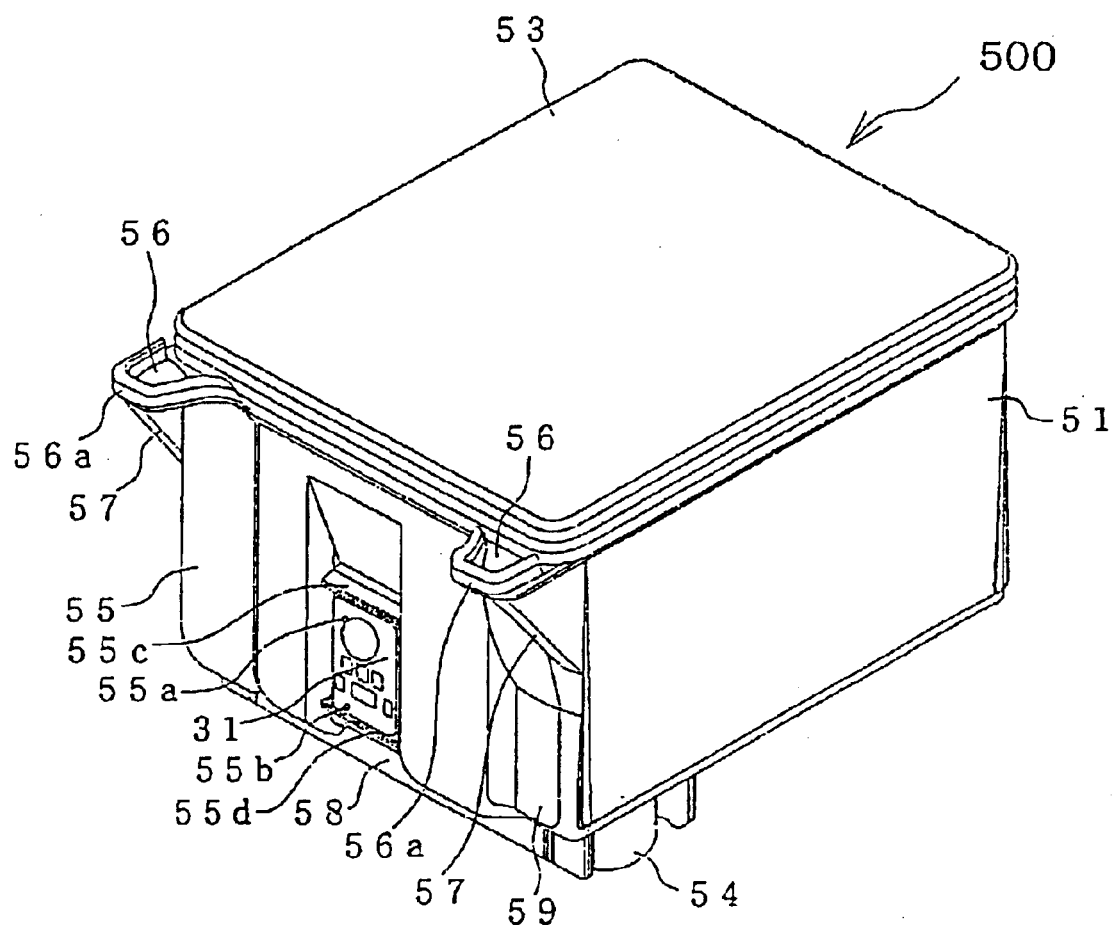
FIG. 16 shows a color ink cartridge 500 having an exposed storage element as one modification of the embodiment.

The storage elements 80 may not be incorporated in the respective ink cartridges 107K and 107F, but may be exposed to the outside. FIG. 16 shows a color ink cartridge 500 having an exposed storage element. The ink cartridge 500 includes a vessel 51 substantially formed in the shape of a rectangular parallelepiped, a porous body (not shown) that is impregnated with ink and accommodated in the vessel 51, and a cover member 53 that covers the top opening of the vessel 51. The vessel 51 is parted into five ink chambers (like the ink chambers 107C, 107LC, 107M, 107LM, and 107Y in the ink cartridge 107F discussed in the above embodiment), which separately keep five different color inks. Ink supply inlets 54 for the respective color inks are formed at specific positions on the bottom face of the vessel 51. The ink supply inlets 54 at the specific positions face ink supply needles (not shown here) when the ink cartridge 500 is attached to a cartridge attachment unit of a printer main body (not shown here). A pair of extensions 56 are integrally formed with the upper end of an upright wall 55, which is located on the side of the ink supply inlets 54. The extensions 56 receive projections of a lever (not shown here) fixed to the printer main body. The extensions 56 are located on both side ends of the upright wall 55 and respectively have ribs 56a. A triangular rib 57 is also formed between the lower face of each extension 56 and the upright wall 55. The vessel 51 also has a check recess 59, which prevents the ink cartridge 500 from being attached to the unsuitable cartridge attachment unit mistakenly.

The upright wall 55 also has a recess 58 that is located on the substantial center of the width of the ink cartridge 500. A circuit board 31 is mounted on the recess 58. The circuit board 31 has a plurality of contacts, which are located to face contacts on the printer main body, and a storage element (not shown) mounted on the rear face thereof. The upright wall 55 is further provided with projections 55a and 55b and extensions 55c and 55d for positioning the circuit board 31.

Like the embodiment discussed above, the ink cartridge 500 of this modified structure enables the required data, such as the data on the remaining quantities of inks, to be stored into the storage element provided on the circuit board 31 in a certain format of addressing, which is different from the format of addressing adopted in the EEPROM 90 of the printer main body 100.

Figure 17:
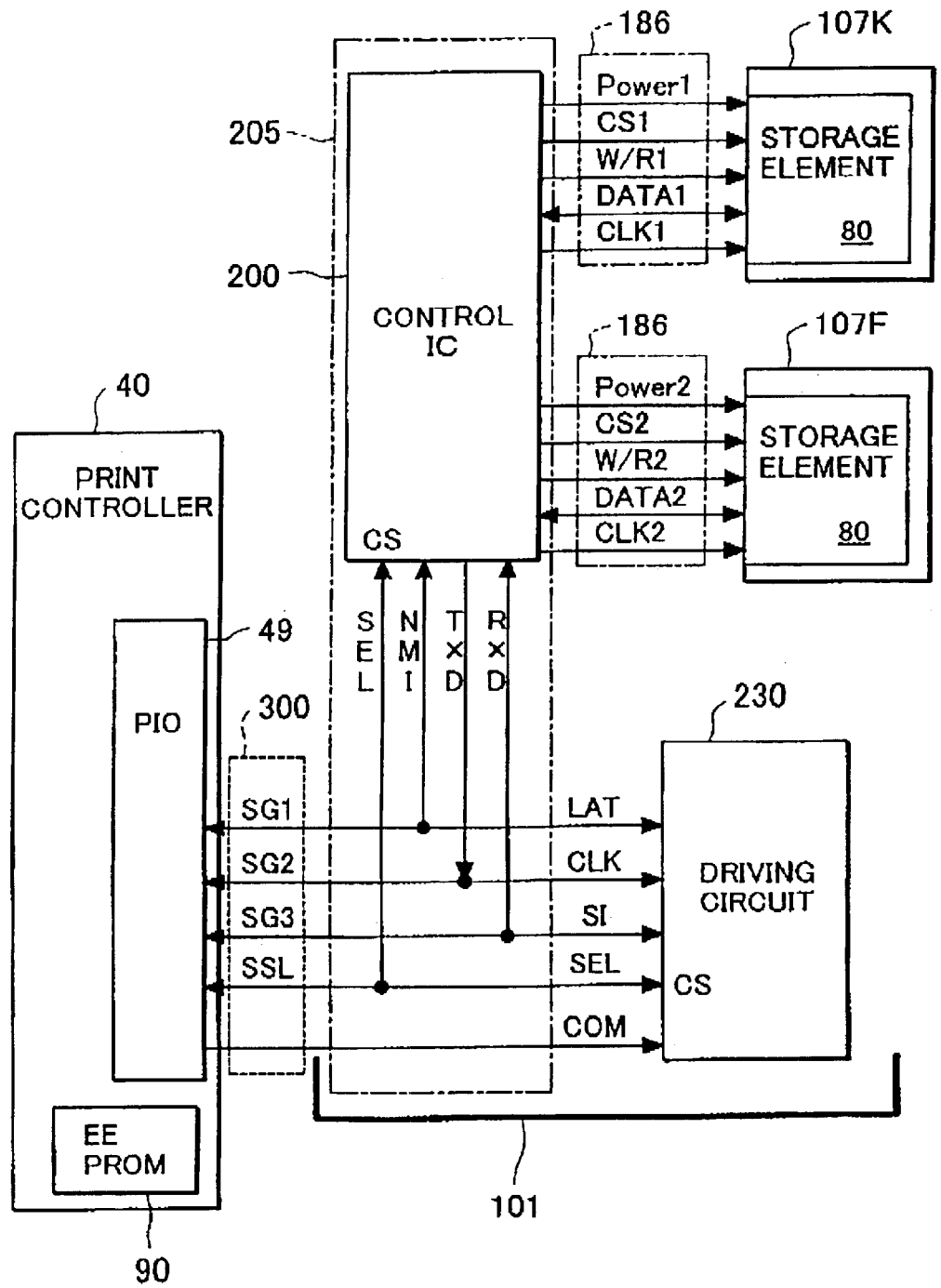
FIG. 17 shows a structure without a transfer controller 220 as another modification of the embodiment.

The structure of the above embodiment utilizes the transfer controller 220, in order to make the signal lines to the control IC 200 completely separate from the signal lines to the driving circuit 230. One modified arrangement provides specific terminals in the control IC 200 and the driving circuit 230 to selectively and exclusively enable the control IC 200 and the driving circuit 230. In this modified structure, there is no requirement of completely separating the signals lines to the control IC 200 from the signal lines to the driving circuit 230. As shown in FIG. 17, this modified structure connects the signal lines to the control IC 200 with the signal lines to the driving circuit 230 through wired communication. The selection control signal SSL is used to exclusively enable either the control IC 200 or the driving circuit 230. For example, the high level of the selection control signal SSL enables the control IC 200, whereas the low level of the selection control signal SSL enables the driving circuit 230. In this case, apart from the other signals, the driving signal COM alone should be input directly into the driving circuit 230. The print controller 40 outputs the signals to the control IC 200 via the signal lines SG1 through SG3 when the selection control signal SSL is at the high level. The print controller 40 outputs the signals to the driving circuit 230 via the signal lines SG1 through SG3 when the selection control signal SSL is at the low level. One possible application restricts the output of the driving signal COM only to the case where the driving circuit 230 is enabled. In this case, the selection control signal SSL is not input into the driving circuit 230 but is used only to enable the control IC 200. The piezoelectric vibrators 17 are not driven unless the driving signal COM is output. Output of the data to the signal lines SG1 through SC3 accordingly does not lead to the wrong activation of the driving circuit 230.

Figure 18:
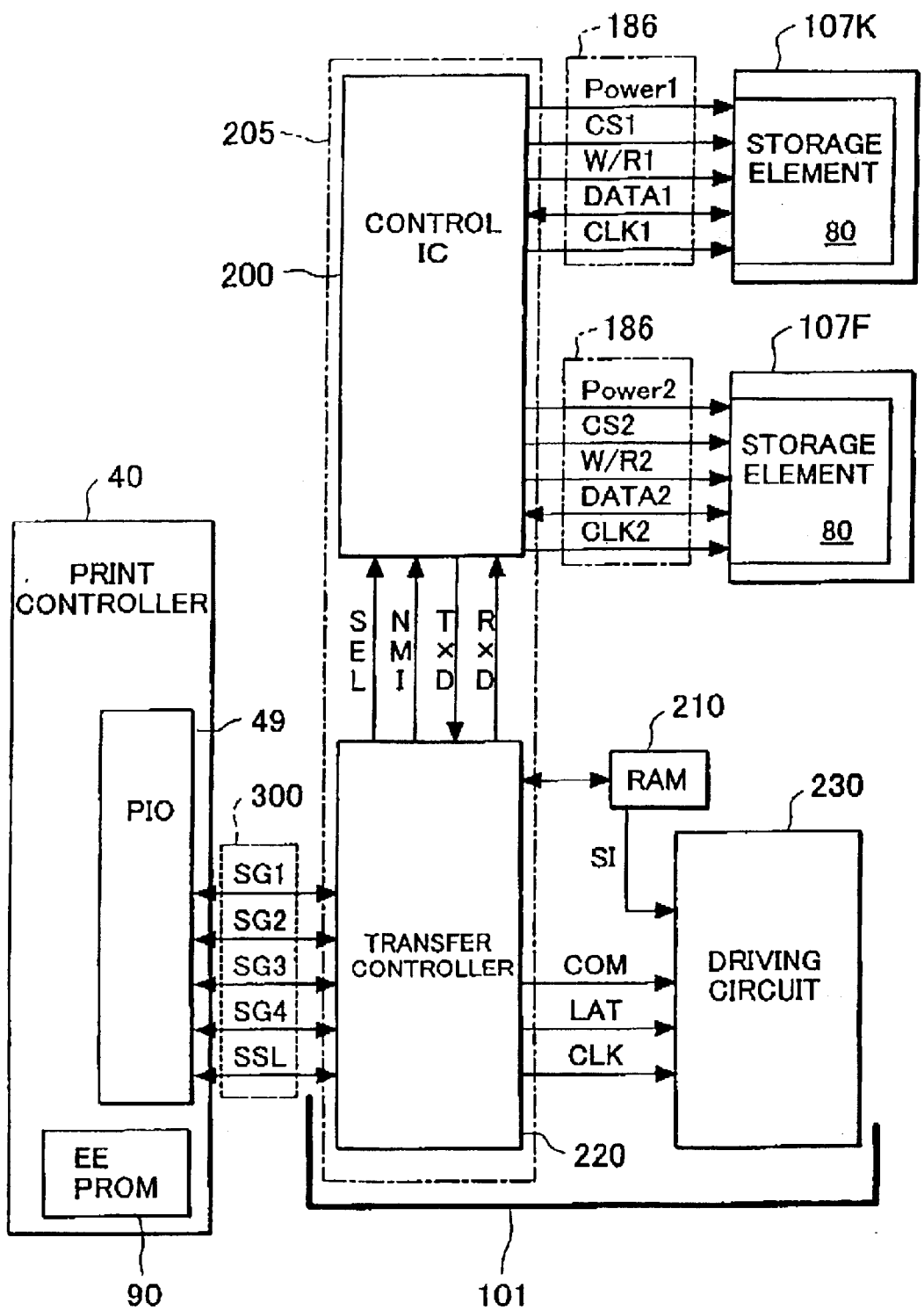
FIG. 18 shows another structure as still another modification of the embodiment.

Another modified structure places the RAM 210 under the control of the transfer controller 220 as shown in FIG. 18. The data on the remaining quantities of inks to be written into the storage elements 80 are temporarily registered in the RAM 210, whereas recording data SI to be transferred to the driving circuit 230 are also temporarily stored in the RAM 210 as a buffer. The recording data SI are successively supplied to the driving circuit 230 synchronously with the clock signal CLK. The buffer is thus favorably used to provide data at an adequate timing. This buffer also works as the memory, in which pieces of information on the remaining quantities of inks to be written into the storage elements 80 are registered temporarily. This arrangement desirably reduces the number of required parts and thereby the manufacturing cost.

The timings of data transmission between the print controller 40 and the storage elements 80 are significantly different from the timings of data transmission between the print controller 40 and the driving circuit 230. By taking advantage of the difference in timing of data transmission, the data holding circuit 130 included in the driving circuit 230 may be used as the memory, in which pieces of information on the remaining quantities of inks to be written into the storage elements 80 are registered temporarily. Signal lines leading from the output of the data holding circuit 130 are connected with the storage elements 80, so that the data holding circuit 130 is usable as the memory, in which the data on the remaining quantities of inks are temporarily registered. Every time the printing operation has been concluded with regard to one page, the data on the remaining quantities of inks are transferred as the recording data SI synchronously with the clock signal CLK and set in the shift registers 13A through 13N. The subsequent output of the latch signal LAT sets the data on the remaining quantities of inks in the latch circuit 14. When the printing operation is carried out subsequently, the data on the remaining quantities of inks temporarily kept in the data holding circuit 130 are abandoned, and the transfer of the standard recording data SI resumes to control the ejection of ink droplets from the nozzle openings 23. When the power switch 92a on the switch panel 92 is operated to turn the power source 91 off while the data on the remaining quantities of inks are temporarily kept in the data holding circuit 130 after the printing operation has been concluded with regard to one page, the data held in the latch circuit 14 are transferred to the storage elements 80 and written into the memory cells 81 of the storage elements 80. The clock signal CLK is used as the clocks for specifying addresses in the memory cells 81. The data written into the memory cells 81 are generated by utilizing the output of the final stage 13N of the shift register circuit 13.

The above embodiment applies the five color inks, that is, magenta, cyan, yellow, light cyan, and light magenta, for the plurality of color inks kept in the color ink cartridge. The principle of the present invention is, however, also applicable to another ink cartridge, in which any combination of an arbitrary number of different inks, for example, six or seven different color inks, are kept. The present invention is further applicable to the structure in which the ink cartridges are set in the printer main body, as well as to the structure in which the ink cartridges are mounted on the carriage. The principle of the present invention may be applied to printers other than the ink jet printers, for example, laser printers using toner ink cartridges and thermal transfer printers using ink ribbon cartridges.

The scope and spirit of the present invention are limited only by the terms of the appended claims.

What is claimed is:

1. A printer, to which an ink cartridge is detachably attached, said ink cartridge keeping ink therein and having a rewritable non-volatile memory, said printer causing the ink kept in the ink cartridge to be transferred from a print head mounted on said printer to a printing medium, thereby implementing a printing operation, said printer comprising:

a printer memory that stores information relating to the ink kept in said ink cartridge into a predetermined area thereof in a predetermined format of addressing, which is different from a serial format of addressing for forwarding the information to the cartridge to store in said non-volatile memory, at least some of the information forwarded from the printer to the cartridge reflecting an ink property that changes as the printer is operated;

a memory writing unit that reads the information relating to the ink kept in the ink cartridge from the predetermined area and writes the read-out information into a specific area of the non-volatile memory, which corresponds to the predetermined area of said printer memory; and an address decoder that converts a storage format of addressing of the information relating to the ink from the predetermined format of addressing into the serial format of addressing when said memory writing unit writes the information.

2. A printer in accordance with claim 1, said printer further comprising:

a cleaning unit that carries out head cleaning in response to a predetermined operation, the head cleaning causing a preset quantity of ink to be transferred from said print head, wherein said memory writing unit writes the information into the non-volatile memory when said cleaning unit is activated to carry out the head cleaning.

3. A printer in accordance with claim 1, wherein the cartridge detachably attached to said printer comprises a black ink cartridge, in which black ink is kept, and a color ink cartridge, in which a plurality of different color inks are kept, and said memory writing unit writes the information into the non-volatile memory that is provided in both the black ink cartridge and the color ink cartridge.

4. A printer and ink cartridge system in which said ink cartridge is detachably attached to said printer, said ink cartridge keeping ink therein and having a rewritable non-volatile memory, said printer causing the ink kept in said ink cartridge to be transferred from a print head mounted on said printer to a printing medium, thereby implementing a printing operation, comprising:

a printer memory, which is part of the printer, that stores information relating to the ink kept in said ink cartridge into a predetermined area thereof in a predetermined format of addressing, which is different from a serial format of addressing for forwarding the information to the cartridge to store in said non-volatile memory;

a memory writing unit, which is part of the printer, that reads the information relating to the ink kept in said ink cartridge from the predetermined area and writes the read-out information into a specific area of said non-volatile memory, which corresponds to the predetermined area of said printer memory; and an address decoder, which is part of the printer, that converts a storage format of addressing of the information relating to the ink from the predetermined format of addressing into the serial format of addressing when said memory writing unit writes the information, at least some of the information forwarded from the printer to the cartridge reflecting an ink property that changes as the printer is operated.

* * * * *